(12) United States Patent
Choi et al.

(10) Patent No.: US 12,469,415 B2
(45) Date of Patent: Nov. 11, 2025

(54) DISPLAY DEVICE AND METHOD OF MANUFACTURING THE SAME

(71) Applicant: Samsung Display Co., Ltd., Yongin-si (KR)

(72) Inventors: Seon Young Choi, Yongin-si (KR); Bon Yong Koo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 37 days.

(21) Appl. No.: 18/492,724

(22) Filed: Oct. 23, 2023

(65) Prior Publication Data

US 2024/0274048 A1    Aug. 15, 2024

(30) Foreign Application Priority Data

Feb. 15, 2023   (KR) .................. 10-2023-0019879

(51) Int. Cl.
*G09G 3/00* (2006.01)
*G06F 3/041* (2006.01)
*G09G 3/3233* (2016.01)
*G09G 3/3275* (2016.01)
*H10K 59/12* (2023.01)
(Continued)

(52) U.S. Cl.
CPC ......... *G09G 3/006* (2013.01); *G06F 3/04164* (2019.05); *G09G 3/3233* (2013.01); *G09G 3/3275* (2013.01); *H10K 59/1201* (2023.02); *H10K 59/131* (2023.02); *H10K 59/871* (2023.02); *G09G 2330/12* (2013.01)

(58) Field of Classification Search
CPC .............. G06F 3/04164; G09G 2330/12; G09G 3/006; G09G 3/3233; G09G 3/3275; H10K 59/1201; H10K 59/131; H10K 59/871
See application file for complete search history.

(56) References Cited

U.S. PATENT DOCUMENTS

2013/0038806 A1\* 2/2013 Tae .................. H10D 86/441
257/E21.531
2017/0345847 A1\* 11/2017 Kim .................. H10K 59/12
(Continued)

FOREIGN PATENT DOCUMENTS

KR        10-1920769 B1    11/2018
KR    10-2020-0076581 A    6/2020
(Continued)

*Primary Examiner* — Kenneth Bukowski
(74) *Attorney, Agent, or Firm* — Womble Bond Dickinson (US) LLP

(57) ABSTRACT

A display device includes: a substrate; a circuit layer on a first surface of the substrate; a circuit board on a second surface of the substrate opposite to the first surface; and a display driving circuit on the circuit board to supply data signals of data lines. The substrate includes: a first support layer and a second support layer; and a pad conductive layer between the first support layer and the second support layer, and including signal pads connected to the circuit board, and pad connection lines connected to the signal pads. The circuit layer further includes: data connection lines in a non-display area electrically connected to the data lines; and data bridge lines electrically connecting data pad connection lines of the pad connection lines and the data connection lines to each other. An end of each of the data bridge lines is aligned with an edge of the substrate.

16 Claims, 21 Drawing Sheets

(51) Int. Cl.
*H10K 59/131* (2023.01)
*H10K 59/80* (2023.01)

(56) References Cited

U.S. PATENT DOCUMENTS

| | | | |
|---|---|---|---|
| 2018/0122886 A1* | 5/2018 | Kim | H10D 86/00 |
| 2020/0203235 A1* | 6/2020 | Jung | H10D 86/60 |
| 2022/0013614 A1* | 1/2022 | Jung | H10K 59/126 |
| 2022/0052078 A1* | 2/2022 | Kim | H10K 59/131 |
| 2022/0199852 A1* | 6/2022 | Sung | H01L 25/0753 |

FOREIGN PATENT DOCUMENTS

| | | | |
|---|---|---|---|
| KR | 10-2022-0021062 A | | 2/2022 |
| KR | 20220015826 | * | 2/2022 |
| KR | 10-2022-0088608 A | | 6/2022 |
| KR | 10-2404573 B1 | | 6/2022 |

* cited by examiner

DISPLAY DEVICE AND METHOD OF MANUFACTURING THE SAME

CROSS-REFERENCE TO RELATED APPLICATIONS

This application claims priority to and the benefit of Korean Patent Application No. 10-2023-0019879, filed on Feb. 15, 2023, in the Korean Intellectual Property Office, the entire disclosure of which is incorporated by reference herein.

BACKGROUND

1. Field

Aspects of embodiments of the present disclosure relate to a display device, and a method of manufacturing the same.

2. Description of Related Art

As the information society develops, various demands for display devices for displaying images are increasing in various forms. For example, display devices are applied to various electronic devices, such as smartphones, digital cameras, notebook computers, navigation devices, and smart televisions.

A display device may include a display panel that emits light for displaying an image, and a driver that supplies signals and/or power for driving the display panel.

At least one surface of the display device may be referred to as a display surface on which the image is displayed. The display surface may include a display area in which a plurality of emission areas for emitting light for displaying the image are arranged, and a non-display area disposed around the display area.

The display device may include data lines disposed in the display area and for transmitting data signals to the emission areas, and a display driving circuit for supplying the data signals to the data lines.

The above information disclosed in this Background section is for enhancement of understanding of the background of the present disclosure, and therefore, it may contain information that does not constitute prior art.

SUMMARY

In order to reduce a defect rate, the display device may include a lighting test driver for adjusting and verifying a display quality. The lighting test driver may supply test driving signals for various lighting tests of light emitting elements. In order to verify whether pixel drivers are normal (e.g., operating normally), the lighting test driver may supply test data signals, instead of the display driving circuit. Accordingly, the lighting test driver may be disposed in the non-display area together with connection lines for electrical connection between the data lines and the display driving circuit, and may be electrically connected to the connection lines. However, because the lighting test driver for the lighting test is disposed in the non-display area, there may be limitations in reducing the width of the non-display area (e.g., the width of the non-display area may be increased).

Embodiments of the present disclosure are directed to a display device that may perform a lighting test to reduce a defect rate while reducing a width of a non-display area, and a method of manufacturing the display device.

However, the aspects and features of the present disclosure are not limited to those set forth herein. The above and other aspects and features of the present disclosure will become more apparent to those having ordinary skill in the art by referring to the detailed description, the figures, and the claims.

According to one or more embodiments of the present disclosure, a display device includes: a substrate including: a display area including emission areas; and a non-display area around the display area; a circuit layer on a first surface of the substrate, and including pixel drivers corresponding to the emission areas, respectively, and data lines configured to transmit data signals to the pixel drivers; a circuit board on a second surface of the substrate opposite to the first surface; and a display driving circuit on the circuit board, and configured to supply the data signals of the data lines. The substrate includes: a first support layer and a second support layer facing each other; and a pad conductive layer between the first support layer and the second support layer, and including signal pads connected to the circuit board, and pad connection lines connected to the signal pads, respectively. The signal pads include data pads electrically connected to the display driving circuit, the pad connection lines include data pad connection lines connected to the data pads, respectively, and the circuit layer further includes: data connection lines in the non-display area, and electrically connected to the data lines, respectively; and data bridge lines electrically connecting the data pad connection lines and the data connection lines to each other, respectively. An end of each of the data bridge lines is aligned with an edge of the substrate.

In an embodiment, the second support layer may include the first surface of the substrate; the first support layer may include the second surface of the substrate; the substrate may further include: a first barrier layer on a surface of the first support layer opposite to the second surface; and a second barrier layer on a surface of the second support layer opposite to the first surface; the pad connection lines may be located between the first barrier layer and the second barrier layer; the signal pads may be located between the second barrier layer and the first support layer; and the circuit board may be connected to the signal pads through a substrate hole penetrating the first support layer.

In an embodiment, the circuit layer may include: a buffer layer on the substrate; a first semiconductor layer on the buffer layer; a first gate insulating layer covering the first semiconductor layer; a first gate conductive layer on the first gate insulating layer; a second gate insulating layer covering the first gate conductive layer; a second gate conductive layer on the second gate insulating layer; a first interlayer insulating layer covering the second gate conductive layer; a first source-drain conductive layer on the first interlayer insulating layer; a first planarization layer covering the first source-drain conductive layer; a second source-drain conductive layer on the first planarization layer; and a second planarization layer covering the second source-drain conductive layer. The second source-drain conductive layer may include the data lines.

In an embodiment, each of the data connection lines may be located in one of the first gate conductive layer or the second gate conductive layer.

In an embodiment, the first source-drain conductive layer may include the data bridge lines; and the data bridge lines may be electrically connected to the data connection lines, respectively, through first bridge connection holes penetrating at least the first interlayer insulating layer from among the first interlayer insulating layer and the second gate insulating layer.

In an embodiment, the data bridge lines may be electrically connected to the data pad connection lines through second bridge connection holes, respectively; and each of the second bridge connection holes may include: a first through hole penetrating the first interlayer insulating layer, the second gate insulating layer, the first gate insulating layer, and the buffer layer; and a second through hole penetrating the second support layer and the second barrier layer.

In an embodiment, the circuit layer may further include: a second semiconductor layer on the first interlayer insulating layer; a third gate insulating layer covering the second semiconductor layer; a third gate conductive layer on the third gate insulating layer; and a second interlayer insulating layer covering the third gate conductive layer. The first source-drain conductive layer may be on the second interlayer insulating layer; the third gate conductive layer may include the data bridge lines; and the data bridge lines may be electrically connected to the data connection lines, respectively, through first bridge connection holes penetrating at least the third gate insulating layer and the first interlayer insulating layer from among the third gate insulating layer, the first interlayer insulating layer, and the second gate insulating layer.

In an embodiment, the display device may further include: a light emitting element layer on the circuit layer, and including light emitting elements corresponding to the emission areas, respectively; a sealing layer on the circuit layer, and covering the light emitting element layer; and a side overcoat layer covering the edge of the substrate aligned with the ends of the data bridge lines, an edge of the circuit layer, and an edge of the sealing layer.

According to one or more embodiments of the present disclosure, a method of manufacturing a display device, includes: preparing a substrate to include a display area including emission areas, a non-display area around the display area, and a sub-area extending from a portion of the non-display area; placing a circuit layer on a first surface of substrate, the circuit layer including pixel drivers corresponding to the emission areas, respectively, data lines configured to transmit data signals to the pixel drivers, and a lighting test driver electrically connected to the data lines; placing a light emitting element layer on the circuit layer, the light emitting element layer including light emitting elements corresponding to the emission areas, respectively; placing a sealing layer on the light emitting element layer; performing a lighting test on the light emitting elements using the lighting test driver; and separating the sub-area from the non-display area. In the separating of the sub-area from the non-display area, the lighting test driver in the sub-area is removed from the circuit layer.

In an embodiment, the substrate may include: a first support layer including the display area, the non-display area, and the sub-area; a first barrier layer covering a portion of the first support layer; a pad conductive layer on the first support layer and the first barrier layer; a second barrier layer covering the pad conductive layer; and a second support layer covering the second barrier layer. The second support layer may include the first surface of the substrate; and the pad conductive layer may include: signal pads between the first support layer and the second barrier layer; and pad connection lines between the first barrier layer and the second barrier layer, and connected to the signal pads, respectively.

In an embodiment, the pad connection lines may include data pad connection lines connected to data pads from among the signal pads, respectively; and in the placing of the circuit layer, the circuit layer may further include: data connection lines in the non-display area, and electrically connected to the data lines, respectively; test signal supply lines in the sub-area, and electrically connected to the lighting test driver; and data bridge lines electrically connecting the data connection lines, the test signal supply lines, and the data pad connection lines to each other, respectively.

In an embodiment, the circuit layer may include: a buffer layer on the second support layer; a first semiconductor layer on the buffer layer; a first gate insulating layer covering the first semiconductor layer; a first gate conductive layer on the first gate insulating layer; a second gate insulating layer covering the first gate conductive layer; a second gate conductive layer on the second gate insulating layer; a first interlayer insulating layer covering the second gate conductive layer; a first source-drain conductive layer on the first interlayer insulating layer; a first planarization layer covering the first source-drain conductive layer; a second source-drain conductive layer on the first planarization layer; and a second planarization layer covering the second source-drain conductive layer. The second source-drain conductive layer may include the data lines; each of the data connection lines may be located in one of the first gate conductive layer or the second gate conductive layer; and each of the test signal supply lines may be located in one of the first gate conductive layer or the second gate conductive layer.

In an embodiment, the first source-drain conductive layer may include the data bridge lines; the data bridge lines may be electrically connected to the data connection lines, respectively, through first bridge connection holes penetrating at least the first interlayer insulating layer from among the first interlayer insulating layer and the second gate insulating layer; the data bridge lines may be electrically connected to the data pad connection lines, respectively, through second bridge connection holes; the data bridge lines may be electrically connected to the test signal supply lines, respectively, through third bridge connection holes penetrating at least the first interlayer insulating layer from among the first interlayer insulating layer and the second gate insulating layer; and each of the second bridge connection holes may include: a first through hole penetrating the first interlayer insulating layer, the second gate insulating layer, the first gate insulating layer, and the buffer layer; and a second through hole penetrating the second support layer and the second barrier layer.

In an embodiment, the circuit layer may further include: a second semiconductor layer on the first interlayer insulating layer; a third gate insulating layer covering the second semiconductor layer; a third gate conductive layer on the third gate insulating layer; and a second interlayer insulating layer covering the third gate conductive layer. The first source-drain conductive layer may be on the second interlayer insulating layer; the third gate conductive layer may include the data bridge lines; and the data bridge lines may be electrically connected to the data connection lines, respectively, through first bridge connection holes penetrating at least the third gate insulating layer and the first interlayer insulating layer from among the third gate insulating layer, the first interlayer insulating layer, and the second gate insulating layer.

In an embodiment, after the separating of the sub-area from the non-display area, the method may further include: placing a circuit board under the first support layer, the circuit board including a display driving circuit thereon for supplying the data signals of the data lines; and electrically connecting the circuit board to the signal pads through a substrate hole penetrating the first support layer.

In an embodiment, after the separating of the sub-area from the non-display area, an end of each of the data bridge lines may be aligned with an edge of the substrate.

In an embodiment, after the separating of the sub-area from the non-display area, the method may further include placing a side overcoat layer to cover the edge of the substrate aligned with the ends of the data bridge lines, an edge of the circuit layer, and an edge of the sealing layer.

The aspects and features of the present disclosure are not limited to those above, and various other aspects and features are included in the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
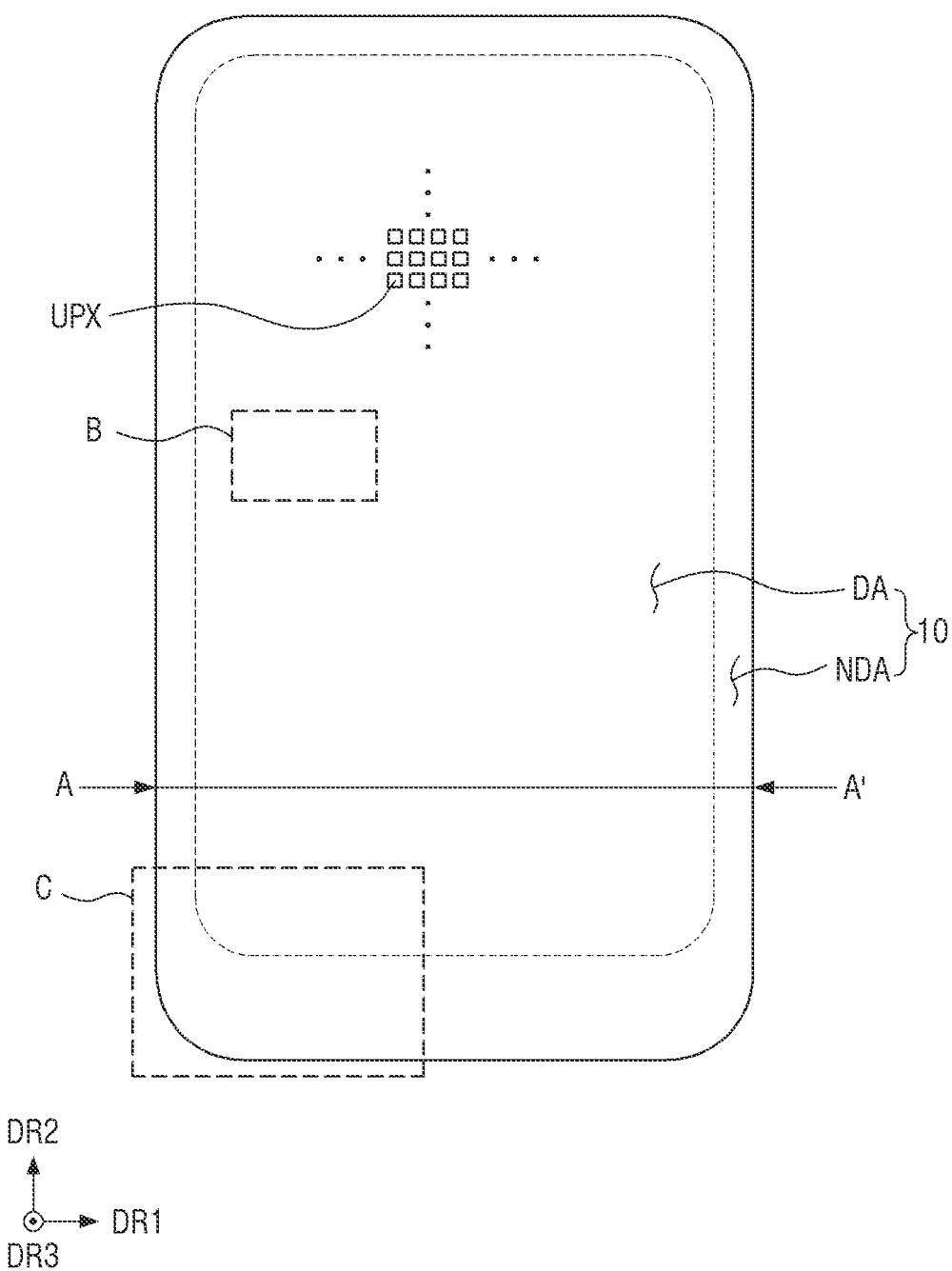
FIG. 1 is a plan view of a display surface of a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

As used herein, the phrase "in a plan view" means when an object portion is viewed from above, and the phrases "in a cross-sectional view" and "in a schematic cross-sectional view" means when a schematic cross-section taken by vertically cutting an object portion is viewed from the side. The terms "overlap" or "overlapped" mean that a first object may be above or below or to a side of a second object, and/or vice versa. Additionally, the term "overlap" may include layers, stacks, face or facing, extending over, covering, or partly covering or any other suitable term as would be appreciated and understood by those of ordinary skill in the art. The expression "not overlap" may include a meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. For example, the term "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a plan view of a display surface of a display device 10 according to an embodiment.

Referring to FIG. 1, the display device 10 is a device for displaying moving images and/or still images. The display device 10 may be used as a display screen in various suitable portable electronic devices, such as mobile phones, smartphones, tablet personal computers (PCs), smart watches, watch phones, mobile communication terminals, electronic notebooks, electronic books, portable multimedia players (PMPs), navigation devices, and ultra-mobile PCs (UMPCs), as well as in various suitable products, such as televisions, notebook computers, monitors, billboards, and Internet of things (IoT) devices.

The display device 10 may be a light emitting display device, such as an organic light emitting display device using an organic light emitting diode, a quantum dot light emitting display device including a quantum dot light emitting layer, an inorganic light emitting display device including an inorganic semiconductor, or a micro- or nano-light emitting display device using a micro- or nano-light emitting diode. For convenience, a case where the display device 10 is an organic light emitting display device will be mainly described in more detail below. However, the present disclosure is not limited thereto, and various embodiments are also applicable to display devices including an organic insulating material, an organic light emitting material, and/or a metal material.

The display device 10 may be formed to be flat or substantially flat, but the present disclosure is not limited thereto. For example, the display device 10 may include curved portions formed at left and right ends, and having a constant or varying curvature. In addition, the display device 10 may be formed to be flexible, so that it can be curved, bent, folded, or rolled.

At least one surface of the display device 10 may be a display surface on which an image is displayed.

The display surface of the display device 10 may include a display area DA, in which unit pixels UPX for displaying an image are arranged, and a non-display area NDA located around (e.g., adjacent to or to surround around a periphery of) the display area DA.

The unit pixels UPX may be arranged in the display area DA in a first direction DR1 and/or a second direction DR2. The unit pixels UPX may be the minimum units that display light of various suitable colors with their respective luminances. Each of the unit pixels UPX may include two or more emission areas EA (e.g., see FIG. 3) that are adjacent to each other.

To prepare the unit pixels UPX, the emission areas EA may be arranged in the display area DA.

Each of the emission areas EA may be a minimum unit that displays light of a suitable color (e.g., a specific or predetermined color) with its luminance.

The display area DA may be shaped like a rectangular plane having short sides in (e.g., extending in) the first direction DR1 and long sides in (e.g., extending in) the second direction DR2 crossing (e.g., intersecting) the first direction DR1. Each corner where a short side extending in the first direction DR1 meets a long side extending in the second direction DR2 may be rounded with a suitable curvature (e.g., a predetermined curvature) or may be right-angled. The planar shape of the display area DA is not limited to a quadrilateral shape, and may be another polygonal shape, a circular shape, or an oval shape.

The display area DA may occupy most of the display surface. The display area DA may be disposed in the center of the display surface.

The non-display area NDA may be disposed around (e.g., adjacent to) the display area DA. For example, the display area DA may be surrounded (e.g., around a periphery thereof) by the non-display area NDA.

Figure 2:
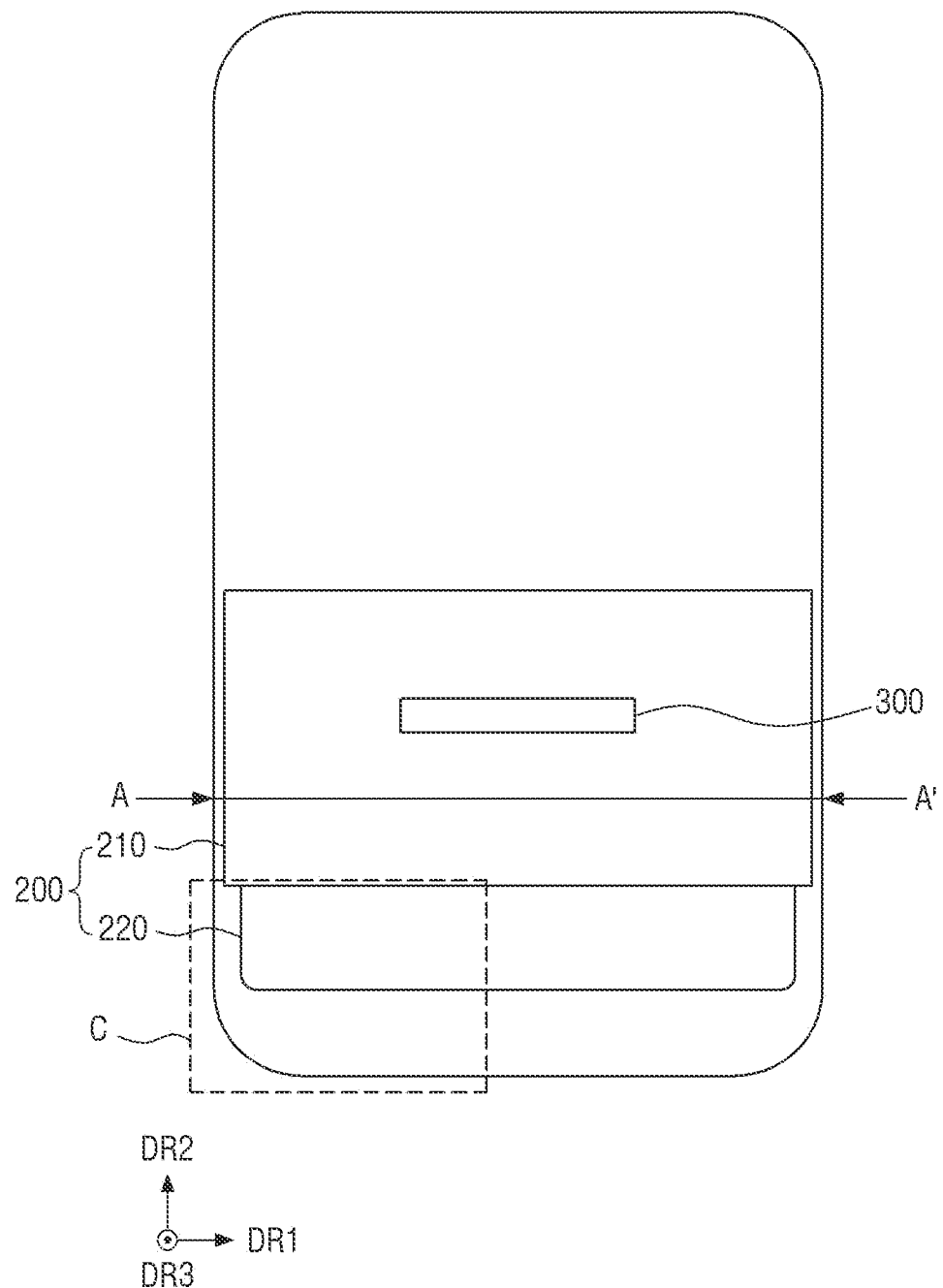
FIG. 2 is a plan view of a rear surface opposite to the display surface of the display device according to an embodiment.

FIG. 2 is a plan view of a rear surface opposite to the display surface of the display device 10 according to an embodiment.

Referring to FIG. 2, the display device 10 according to an embodiment may further include a circuit board 200 disposed on the rear surface opposite to the display surface, and a display driving circuit 300 mounted on the circuit board 200.

The circuit board 200 may include a main board portion 210, and a flexible board portion 220 electrically connecting signal pads (e.g., DPD, VDPD, VSPD, GCPD and ESDPD of FIG. 10) disposed on the rear surface of the display device 10 to the main board portion 210.

Figure 10:
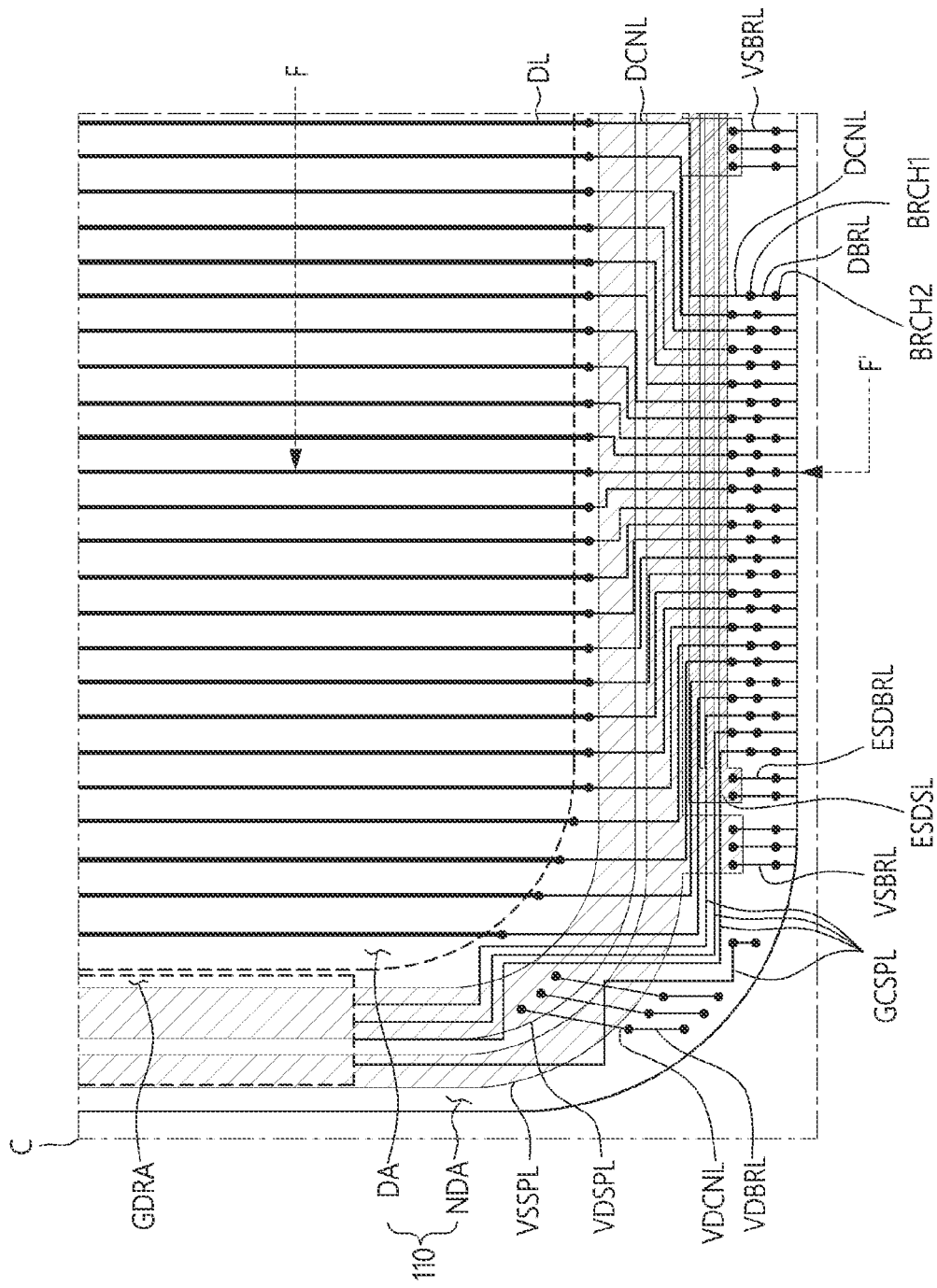
FIG. 10 is a layout view of the portion C of FIG. 1.
Figure 11:
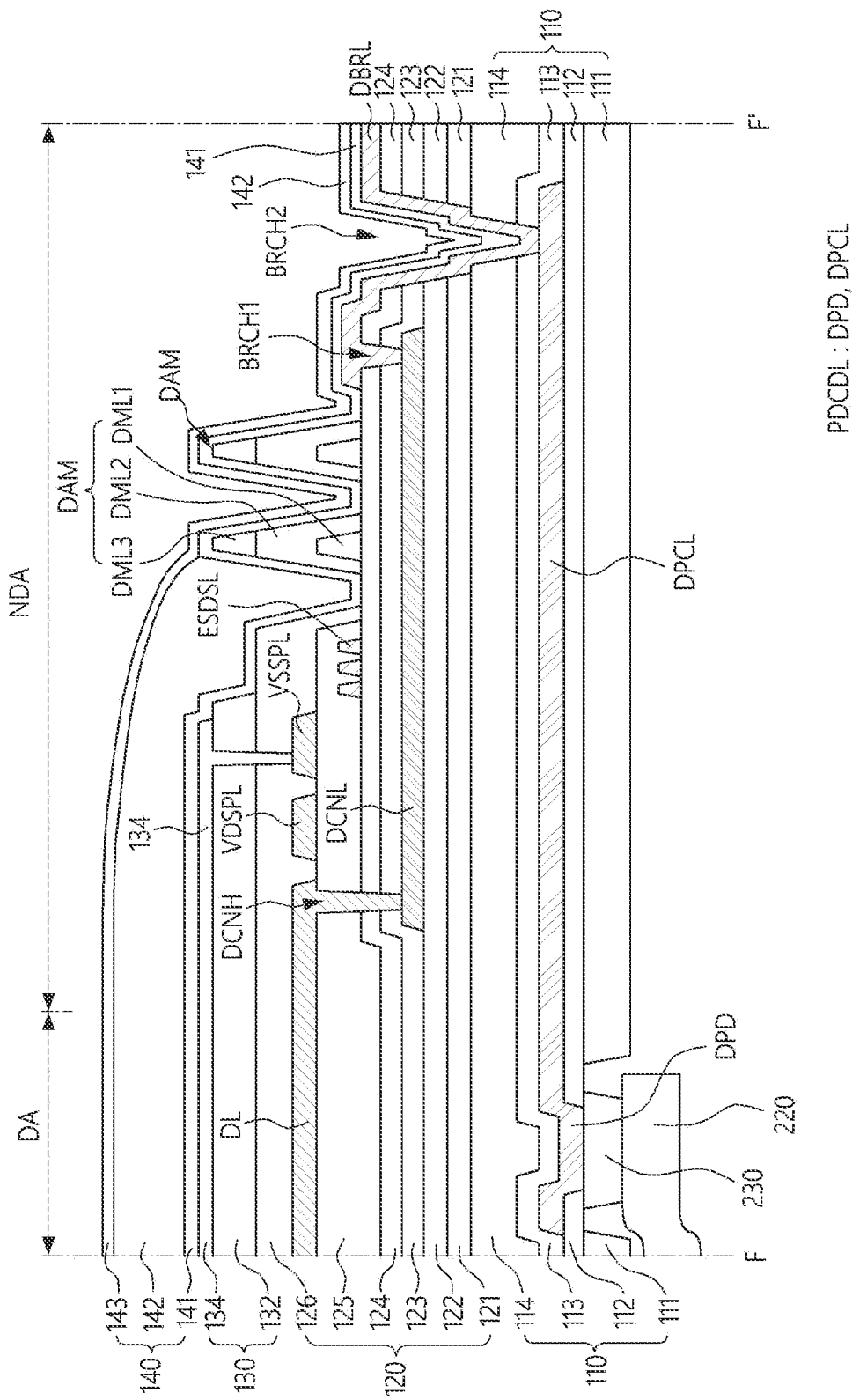
FIG. 11 is a cross-sectional view taken along the line F-F' of FIGS. 9 and 10 according to the first embodiment.

The flexible board portion 220 may be bonded to the signal pads (e.g., DPD, VDPD, VSPD, GCPD and ESDPD of FIG. 10) through a separate conductive adhesive member 230 (e.g., see FIG. 11).

The display driving circuit 300 may be provided as an integrated circuit (IC) and mounted on the main board portion 210.

The display driving circuit 300 may supply data signals to data lines DL (e.g., see FIG. 9), respectively, of a circuit layer 120 (e.g., see FIG. 3) disposed in the display area DA of the display surface.

However, the illustration of FIG. 2 is provided as an example, and the circuit board 200 may also be a single flexible structure, or the display driving circuit 300 may be disposed on the flexible board portion 220. As another example, the display driving circuit 300 may be embedded in the circuit board 200, instead of being provided as a separate IC chip.

Figure 3:
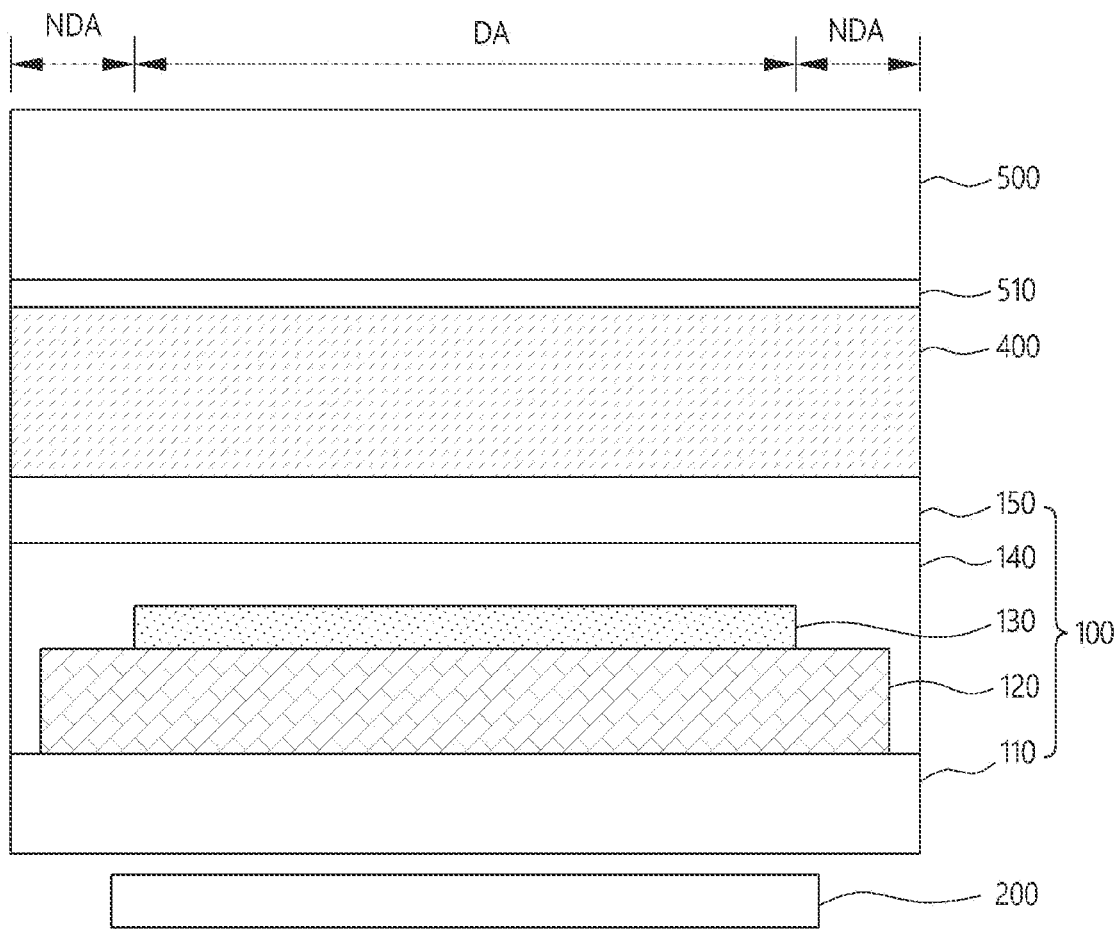
FIG. 3 is a cross-sectional view taken along the line A-A' of FIGS. 1 and 2.

FIG. 3 is a cross-sectional view taken along the line A-A' of FIGS. 1 and 2.

Referring to FIG. 3, the display device 10 according to an embodiment may include a display panel 100 including the display area DA and the non-display area NDA, a polarization member 400 disposed on the display panel 100, and a cover member 500 disposed on the polarization member 400.

The polarization member 400 may polarize external light travelling toward the display panel 100 and light emitted from the display panel 100. The polarization member 400 may reduce a deterioration of a display quality due to reflection of the external light.

The cover member 500 may include (e.g., may be made of) a high-strength glass material. The cover member 500 may be attached to (e.g., fixed on) the polarizing member 400 by a transparent adhesive member 510, such as an optically clear adhesive (OCA) film or an optically clear resin (OCR).

The display panel 100 of the display device 10 according to an embodiment may include a substrate 110, the circuit layer 120, a light emitting element layer 130, and a sealing layer 140.

The substrate 110 includes the display area DA in which the emission areas EA (e.g., see FIG. 3) are arranged, and the non-display area NDA.

The substrate 110 may include (e.g., may be made of) an insulating material, such as a polymer resin. For example, the substrate 110 may be made of polyimide. The substrate 110 may be a flexible substrate that may be bent, folded, or rolled.

According to an embodiment, the substrate 110 may have a multilayered structure including a conductive layer.

The circuit layer 120 is disposed on a first surface of the substrate 110. The first surface of the substrate 110 may correspond to the display surface of the display device 10.

The circuit layer 120 includes pixel drivers PXD (e.g., see FIG. 5) and PXD' (e.g., see FIG. 19) respectively corresponding to the emission areas EA, and the data lines DL for transmitting data signals Vdata to the pixel drivers PXD and PXD'.

The light emitting element layer 130 may be disposed on the circuit layer 120. The light emitting element layer 130 may include light emitting elements LEL (e.g., see FIGS. 5 and 19) corresponding to the emission areas EA, respectively.

The light emitting elements LEL of the light emitting element layer 130 may be electrically connected to the pixel drivers PXD and PXD' of the circuit layer 120, respectively.

The sealing layer 140 may be disposed on the light emitting element layer 130. The sealing layer 140 is designed to block penetration of oxygen and/or moisture into the light emitting element layer 130, and to protect the light emitting element layer 130 from physical impacts caused by foreign substances.

The display panel 100 of the display device 10 according to an embodiment may further include a touch sensor layer 150 disposed on the sealing layer 140.

The touch sensor layer 150 may include touch electrodes for sensing a touch of a person or object.

In addition, the display device 10 may further include the circuit board 200 disposed on a second surface of the substrate 110 opposite to the first surface of the substrate 110 on which the circuit layer 120 is disposed, and the display driving circuit 300 mounted on the circuit board 200 and for supplying the data signals Vdata of the data lines DL of the circuit layer 120.

In addition, the display device 10 may further include a touch driving circuit for driving the touch sensor layer 150.

The touch driving circuit may be provided as an IC and mounted on the circuit board 200.

The touch driving circuit may detect a touch point on the display surface by transmitting touch driving signals to touch driving electrodes of the touch sensor layer 150, and may detect amounts of charge change in mutual capacitance based on respective touch sensing signals of touch nodes received from receiving electrodes of the touch sensor layer 150.

In other words, the touch driving circuit may determine whether or not a user's touch or proximity has occurred based on the touch sensing signal of each of the touch nodes. The user's touch indicates that an object, such as the user's finger or a pen, directly touches a front surface of the display device 10. The user's proximity indicates that the object, such as the user's finger or the pen, hovers above the front surface of the display device 10.

Figure 4:
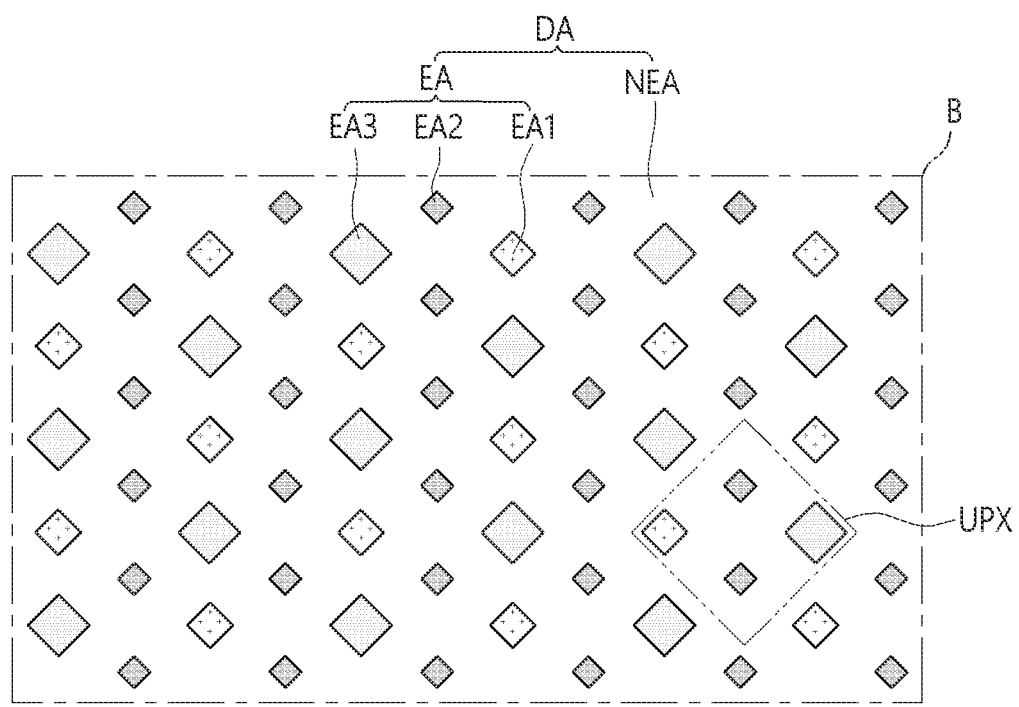
FIG. 4 is a layout view of the portion B of FIG. 1.
Figure 4:
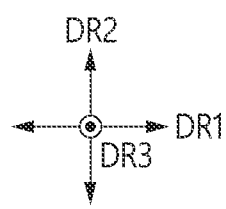

FIG. 4 is a layout view of the portion B of FIG. 1.

Referring to FIG. 4, the display area DA may include the emission areas EA arranged in the first direction DR1 and/or the second direction DR2, and a non-emission area NEA between the emission areas EA.

For example, first emission areas EA1 and third emission areas EA3 may be alternately disposed along the first direction DR1 or the second direction DR2. In addition, second emission areas EA2 may be arranged side by side with each other along the first direction DR1 or the second direction DR2.

The emission areas EA may include the first emission areas EA1 for emitting light of a first color in a suitable wavelength band (e.g., a predetermined wavelength band), the second emission areas EA2 for emitting light of a second color in a wavelength band lower than that of the first color, and the third emission areas EA3 for emitting light of a third color in a wavelength band lower than that of the second color.

For example, the first color may be red in a wavelength band of approximately 600 to 750 nm. The second color may be green in a wavelength band of approximately 480 to 560 nm. The third color may be blue in a wavelength band of approximately 370 to 460 nm.

The unit pixels UPX may be provided by the emission areas EA.

For example, each of the unit pixels UPX may include at least one first emission area EA1, at least one second emission area EA2, and at least one third emission area EA3 that are adjacent to each other. Each of the unit pixels UPX may display the color and the luminance of a mixture of the light emitted from at least one first emission area EA1, at least one second emission area EA2, and at least one third emission area EA3 that are adjacent to each other. Therefore, the unit pixels UPX may be minimum units that display various colors including white and having a desired luminance (e.g., a predetermined luminance).

As illustrated in FIG. 4, the third emission areas EA3 may be larger than the first emission areas EA1, and the first emission areas EA1 may be larger than the second emission areas EA2. However, the present disclosure is not limited thereto, and the size of each of the first through third emission areas EA1 through EA3 may be variously modified according to a desired distance between the emission areas EA, a desired luminance, and/or the like.

In addition, the arrangement of the first emission areas EA1, the second emission areas EA2, and the third emission areas EA3 illustrated in FIG. 4 is provided as an example, and may be variously modified according to the configuration of each unit pixel UPX.

Each of the emission areas EA may have a rhombic planar shape or a rectangular planar shape. However, the present disclosure is not limited thereto, and the planar shape of each of the emission areas EA is not limited to that illustrated in FIG. 4. In other words, the emission areas EA may have a polygonal shape other than a quadrilateral shape, a circular shape, or an oval shape in a plan view.

Figure 5:
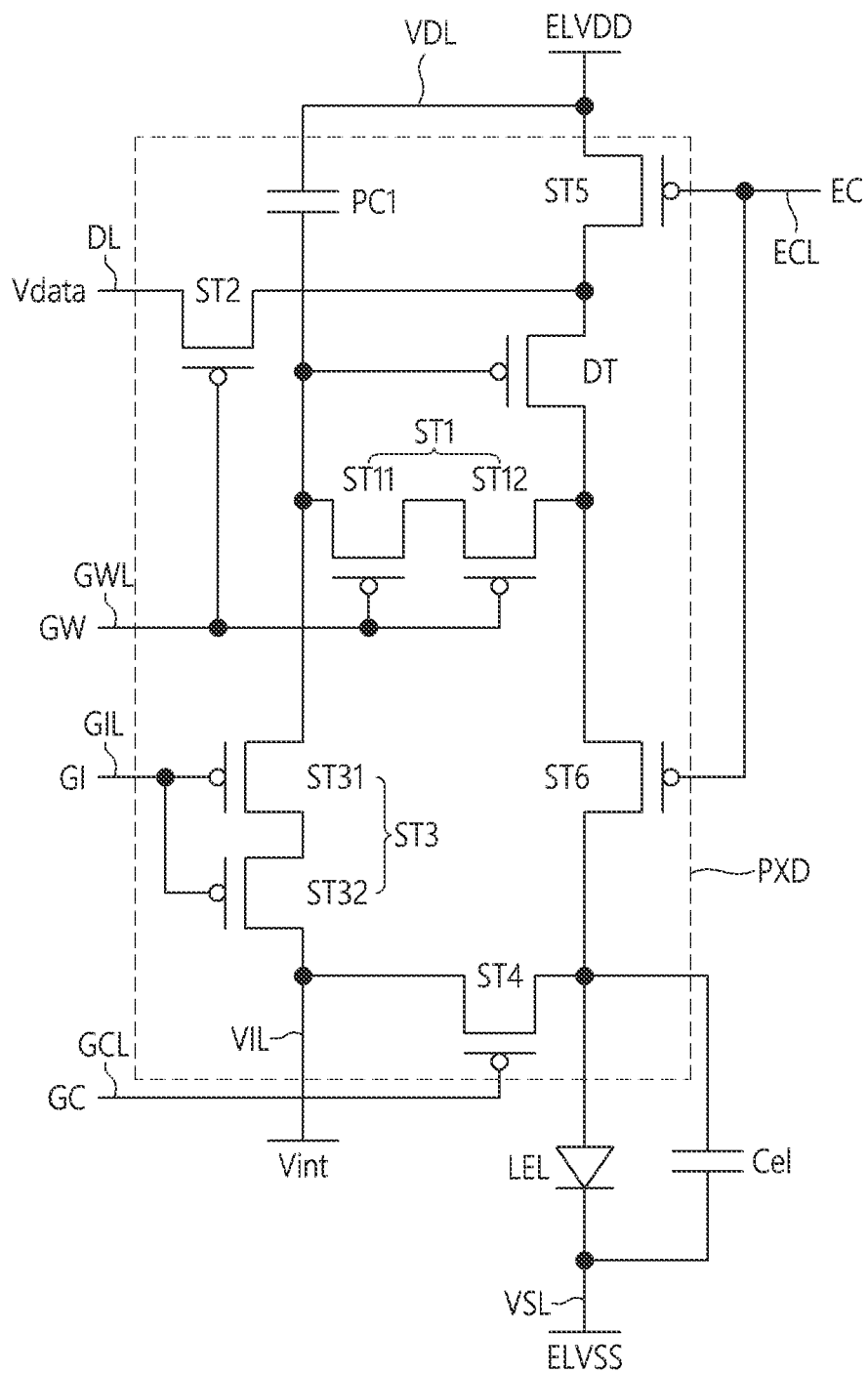
FIG. 5 is an equivalent circuit diagram of an example of a pixel driver corresponding to one of the emission areas of FIG. 4.

FIG. 5 is an equivalent circuit diagram of an example of a pixel driver PXD corresponding to one of the emission areas EA of FIG. 4.

The circuit layer 120 of the display panel 100 of the display device 10 may include the pixel drivers PXD corresponding to the emission areas EA, respectively, and the data lines DL for transmitting the data signals Vdata to the pixel drivers PXD.

The pixel drivers PXD of the circuit layer 120 may be electrically connected to the light emitting elements LEL of the light emitting element layer 130, respectively.

The circuit layer 120 may further include first power lines VDL for transmitting a first power ELVDD to the pixel drivers PXD, and initialization voltage lines VIL for transmitting an initialization voltage Vint to the pixel drivers PXD.

In addition, the circuit layer 120 may further include scan write lines GWL for transmitting scan write signals GW to the pixel drivers PXD, scan initialization lines GIL for transmitting scan initialization signals GI to the pixel drivers PXD, emission control lines ECL for transmitting emission control signals EM to the pixel drivers PXD, and gate control lines GCL for transmitting gate control signals GC to the pixel drivers PXD.

Referring to FIG. 5, one of the pixel drivers PXD of the circuit layer 120 may include a driving transistor DT for generating a driving current to drive a light emitting element LEL electrically connected to the pixel driver PXD. In addition, the pixel driver PXD may further include two or more transistors ST1 through ST6 that are electrically connected to the driving transistor DT, and at least one capacitor PC1.

An anode 131 (e.g., see FIG. 8) of the light emitting element LEL may be electrically connected to the pixel driver PXD, and a cathode 134 of the light emitting element LEL may be electrically connected to a second power line VSL that transmits a second driving power ELVSS having a lower voltage level than that of the first power ELVDD.

The light emitting element LEL may be an organic light emitting diode having a light emitting layer including (e.g., made of) an organic light emitting material. As another example, the light emitting element LEL may be an inorganic light emitting element having a light emitting layer made of an inorganic semiconductor. As another example, the light emitting element LEL may be a quantum dot light emitting element having a quantum dot light emitting layer. As another example, the light emitting element LEL may be a micro-light emitting diode.

A capacitor Cel connected in parallel to the light emitting element LEL may be a parasitic capacitance between the anode 131 and the cathode 134.

The driving transistor DT is connected in series to the light emitting element LEL between the first power line VDL and the second power line VSL. In other words, a first electrode (e.g., a source electrode) of the driving transistor DT may be electrically connected to the first power line VDL through a fifth transistor ST5. In addition, a second electrode (e.g., a drain electrode) of the driving transistor DT may be electrically connected to the anode 131 of the light emitting element LEL through a sixth transistor ST6.

The first electrode of the driving transistor DT may be electrically connected to the data line DL through a second transistor ST2.

A gate electrode of the driving transistor DT may be electrically connected to the first power line VDL through the first capacitor PC1. In other words, the first capacitor PC1 may be electrically connected between the gate electrode of the driving transistor DT and the first power line VDL.

Accordingly, the electric potential of the gate electrode of the driving transistor DT may be maintained or substantially maintained at the first power ELVDD of the first power line VDL.

Therefore, when a data signal Vdata of the data line DL is transmitted to the first electrode of the driving transistor DT through the turned-on second transistor ST2, a voltage difference corresponding to the first power ELVDD and the data signal Vdata may be generated between the gate electrode of the driving transistor DT and the first electrode of the driving transistor DT.

Here, when the voltage difference between the gate electrode of the driving transistor DT and the first electrode of the driving transistor DT, or in other words, a gate-source voltage difference, is equal to or greater than a threshold voltage, the driving transistor DT may be turned on.

Then, when the fifth transistor ST5 and the sixth transistor ST6 are turned on, the driving transistor DT may be connected in series to the light emitting element LEL between the first power line VDL and the second power line VSL. Accordingly, a drain-source current corresponding to the data signal Vdata may be generated by the turned-on driving transistor DT, and supplied as the driving current of the light emitting element LEL.

Therefore, the light emitting element LEL may emit light having a luminance corresponding to the data signal Vdata.

The second transistor ST2 may be connected between the first electrode of the driving transistor DT and the data line DL.

A first transistor ST1 may be connected between the gate electrode of the driving transistor DT and the second electrode of the driving transistor DT.

The first transistor ST1 may include a plurality of sub-transistors that are connected in series. For example, the first transistor ST1 may include a first sub-transistor ST11 and a second sub-transistor ST12.

A first electrode of the first sub-transistor ST11 may be connected to the gate electrode of the driving transistor DT, a second electrode of the first sub-transistor ST11 may be connected to a first electrode of the second sub-transistor ST12, and a second electrode of the second sub-transistor ST12 may be connected to the second electrode of the driving transistor DT.

In this case, it may be possible to prevent or substantially prevent the electric potential of the gate electrode of the driving transistor DT from being changed by a leakage current caused by the first transistor ST1 that is not turned on.

A gate electrode of each of the second transistor ST2, the first sub-transistor ST11, and the second sub-transistor ST12 may be connected to the scan write line GWL.

Accordingly, when a scan write signal GW is received through the scan write line GWL, the second transistor ST2, the first sub-transistor ST11, and the second sub-transistor ST12 may be turned on.

At this time, the data signal Vdata may be transmitted to the first electrode of the driving transistor DT through the turned-on second transistor ST2.

In addition, the gate electrode of the driving transistor DT may have the same electric potential as that of the second electrode of the driving transistor DT through the turned-on first sub-transistor ST11 and second sub-transistor ST12.

Accordingly, the driving transistor DT may be turned on.

A third transistor ST3 may be connected between the gate electrode of the driving transistor DT and the initialization voltage line VIL.

The third transistor ST3 may include a plurality of sub-transistors that are connected in series. For example, the third transistor ST3 may include a third sub-transistor ST31 and a fourth sub-transistor ST32.

A first electrode of the third sub-transistor ST31 may be connected to the gate electrode of the driving transistor DT, a second electrode of the third sub-transistor ST31 may be connected to a first electrode of the fourth sub-transistor ST32, and a second electrode of the fourth sub-transistor ST32 may be connected to the initialization voltage line VIL.

In this case, it may be possible to prevent or substantially prevent the electric potential of the gate electrode of the driving transistor DT from being changed by a leakage current caused by the third transistor ST3 that is not turned on.

A gate electrode of each of the third sub-transistor ST31 and the fourth sub-transistor ST32 may be connected to the scan initialization line GIL.

Accordingly, when a scan initialization signal GI is received through the scan initialization line GIL, the third sub-transistor ST31 and the fourth sub-transistor ST32 may be turned on, thereby, initializing the electric potential of the gate electrode of the driving transistor DT to the initialization voltage Vint of the initialization voltage line VIL.

A fourth transistor ST4 may be connected between the anode of the light emitting element LEL and the initialization voltage line VIL.

A gate electrode of the fourth transistor ST4 may be connected to the gate control line GCL.

Accordingly, when a gate control signal GC is received through the gate control line GCL, the fourth transistor ST4 may be turned on.

At this time, the electric potential of the anode of the light emitting element LEL may be initialized to the initialization voltage Vint of the initialization voltage line VIL through the turned-on fourth transistor ST4.

Therefore, the light emitting element LEL may be prevented or substantially prevented from being driven by a current remaining in the anode.

The fifth transistor ST5 may be connected between the first electrode of the driving transistor DT and the first power line VDL.

The sixth transistor ST6 may be connected between the second electrode of the driving transistor DT and the anode of the light emitting element LEL.

A gate electrode of each of the fifth transistor ST5 and the sixth transistor ST6 may be connected to an emission control line ECL.

Accordingly, when an emission control signal EM is received through the emission control line ECL, the fifth transistor ST5 and the sixth transistor ST6 may be turned on, thereby, supplying the drain-source current of the driving transistor DT as the driving current of the element LEL.

Figure 19:
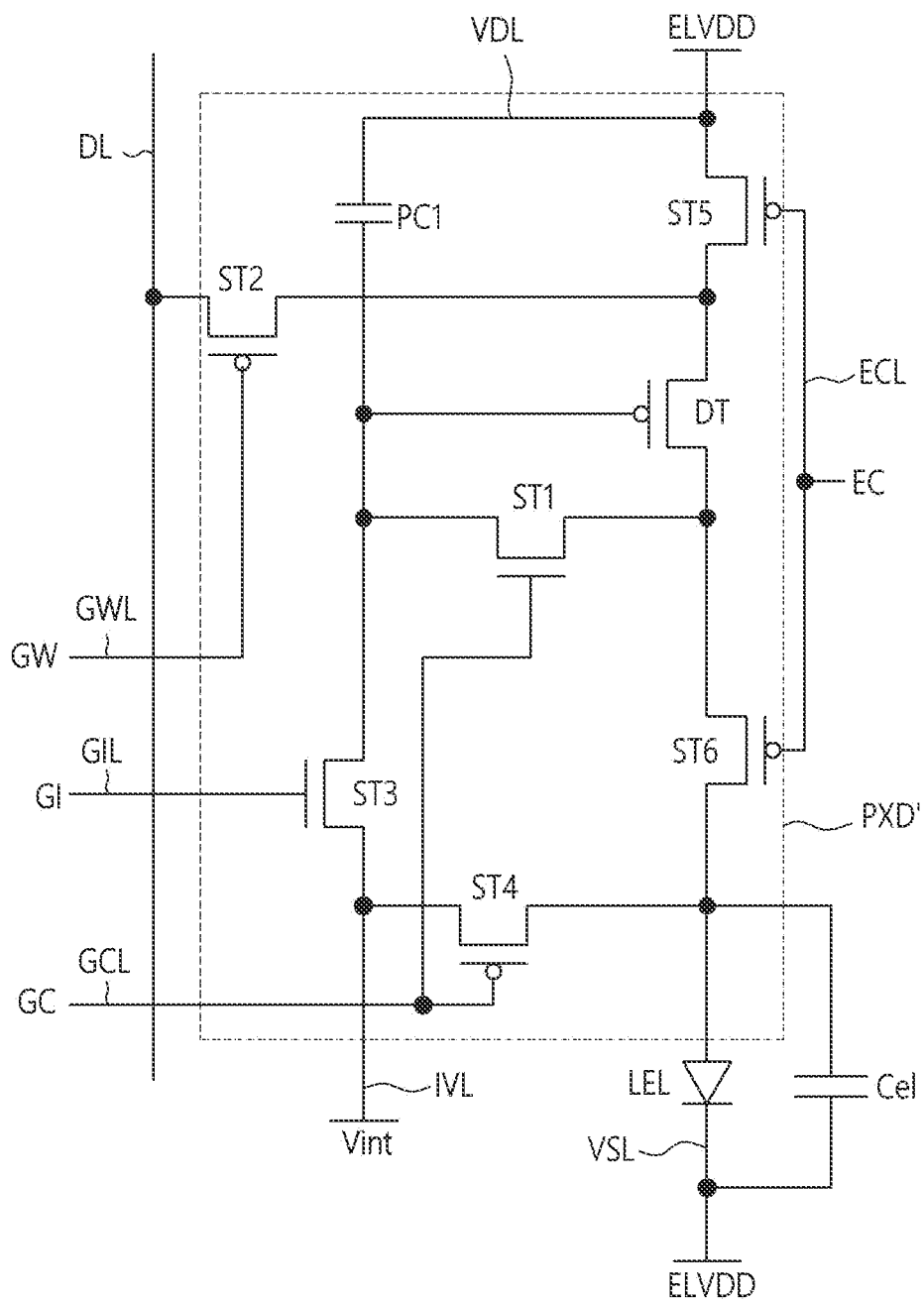
FIG. 19 is an equivalent circuit diagram of another example of a pixel driver corresponding to one of the emission areas of FIG. 4.

Although the driving transistor DT and the first through sixth transistors ST1 through ST6 included in the pixel driver PXD of FIG. 5 are all illustrated as N-type metal oxide semiconductor field effect transistors (MOSFETs), the present disclosure is not limited thereto. For example, as illustrated in FIG. 19, at least one of the driving transistor DT or the first through sixth transistors ST1 through ST6 included in the pixel driver PXD may be a P-type MOSFET.

Figure 6:
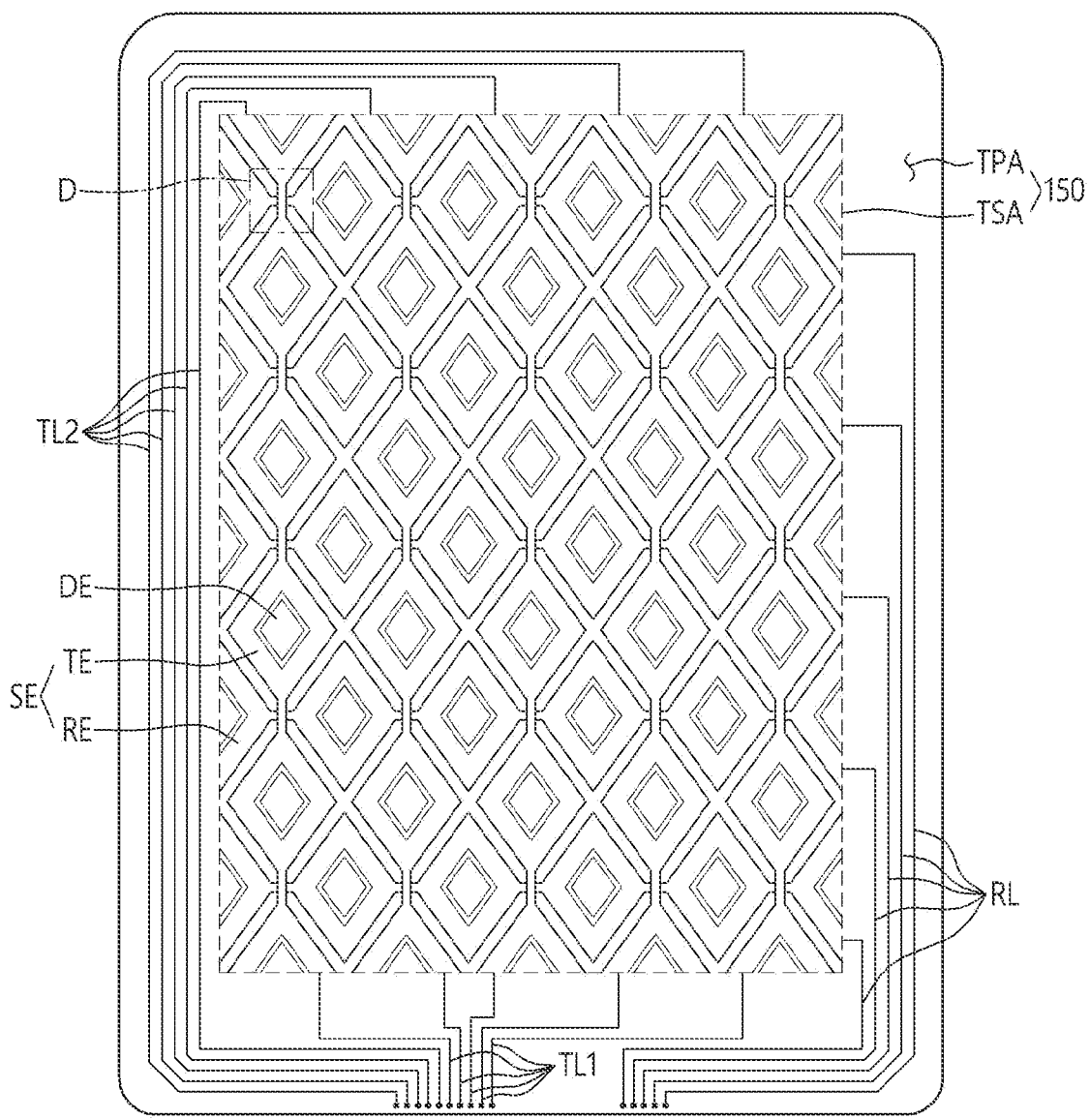
FIG. 6 is a layout view of an example of a touch sensor layer of FIG. 3.
Figure 7:
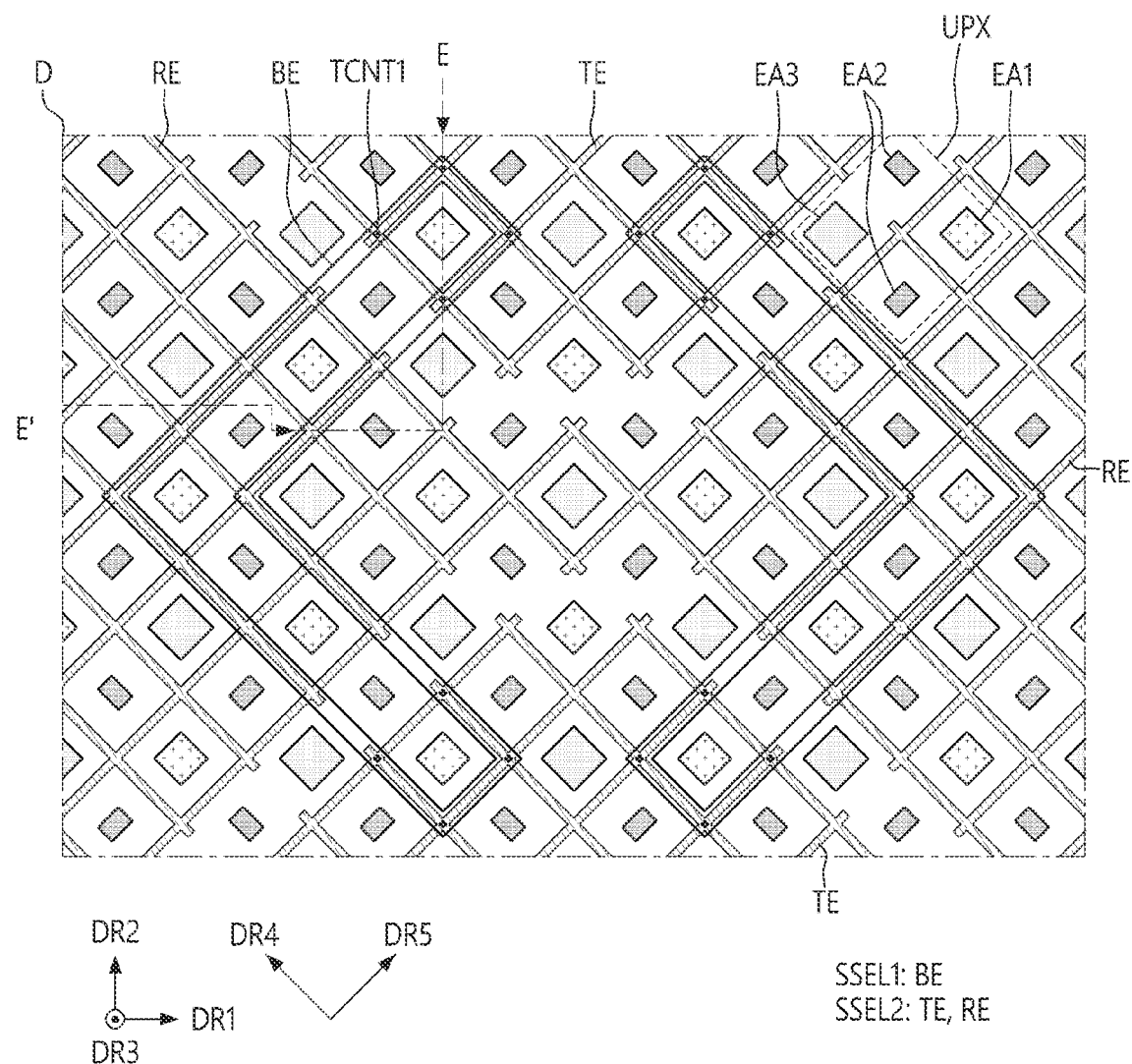
FIG. 7 is an enlarged view illustrating the portion D of FIG. 6 in more detail.
Figure 8:
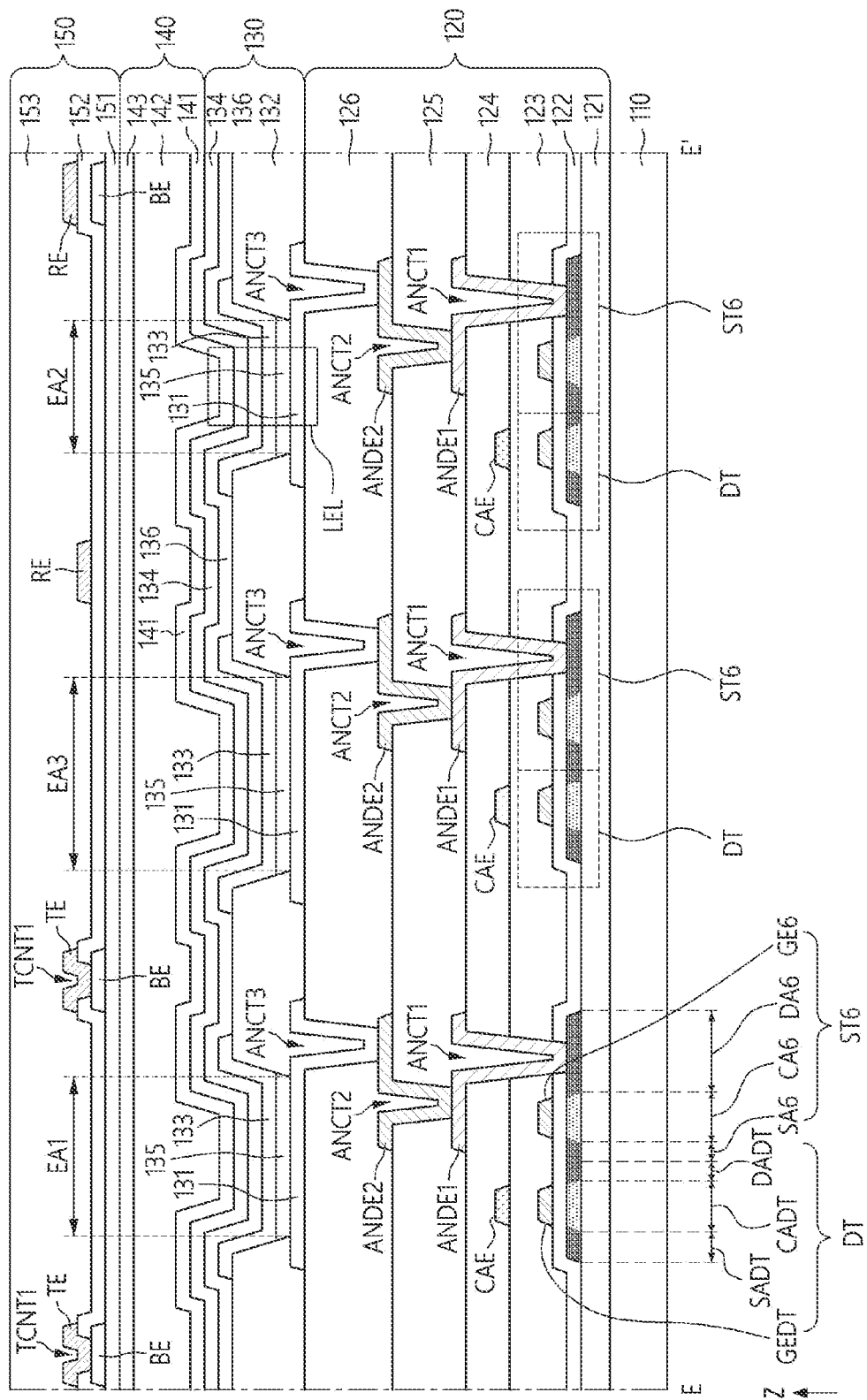
FIG. 8 is a cross-sectional view taken along the line E-E' of FIG. 7 according to a first embodiment.

FIG. 6 is a layout view of an example of the touch sensor layer 150 of FIG. 3. FIG. 7 is an enlarged view illustrating the portion D of FIG. 6 in more detail. FIG. 8 is a cross-sectional view taken along the line E-E' of FIG. 7 according to a first embodiment.

FIG. 6 shows a capacitive touch sensor layer 150. In this case, the touch driving circuit may detect a touch based on a change in capacitance. However, the present disclosure is not limited thereto, and the touch sensor layer 150 is not limited to the illustration in FIG. 6.

For convenience of illustration, FIG. 6 illustrates only some of the elements of the touch sensor layer 150.

Referring to FIG. 6, the touch sensor layer 150 may include a touch sensing area TSA for sensing a user's touch, and a touch peripheral area TPA around (e.g., adjacent to or surrounding around a periphery of) the touch sensing area TSA.

The touch sensing area TSA may be wider than the display area DA, and may be similar to the display area DA. Accordingly, the touch peripheral area TPA disposed around the touch sensing area TSA may be similar to the non-display area NDA disposed around the display area DA.

For example, the touch sensing area TSA may overlap with the display area DA and edges of the non-display area NDA adjoining with the display area DA. In this case, the touch peripheral area TPA may overlap with remaining portions of the non-display area NDA that does not correspond to the touch sensing area TSA.

The touch sensor layer 150 may include sensor electrodes SE and dummy electrodes DE arranged in a matrix in the touch sensing area TSA to generate a mutual capacitance, and sensor lines SENL disposed in the touch peripheral area TPA.

The sensor electrodes SE may include touch driving electrodes TE to which driving signals are transmitted, and receiving electrodes RE for sensing voltages charged in a mutual capacitance with the touch driving electrodes TE.

The sensor lines SENL may include first driving lines TL1, second driving lines TL2, and sensing lines RL.

Each of the first and second driving lines TL1 and TL2 may be electrically connected to two or more touch driving electrodes TE that are connected to each other in the second direction DR2 from among the touch driving electrodes TE.

The first driving lines TL1 may extend from a portion of the touch peripheral area TPA, which is between one side of the touch sensing area TSA in the second direction DR2 and a sub-area SBA (e.g., see FIG. 12), to the sub-area SBA.

The second driving lines TL2 may extend from a portion of the touch peripheral area TPA in contact with another side of the touch sensing area TSA in the second direction DR2 to the sub-area SBA via a portion of the touch peripheral area TPA in contact with one side of the touch sensing area TSA in the first direction DR1.

Each of the sensing lines RL may be electrically connected to two or more receiving electrodes RE that are connected to each other in the first direction DR1 from among the receiving electrodes RE.

The receiving electrodes RE may be arranged side by side with one another in the first direction DR1. The receiving electrodes RE neighboring each other in the first direction DR1 may be electrically connected to each other through a protruding portion protruding in the first direction DR1.

The touch driving electrodes TE may be arranged side by side with one another in the second direction DR2. The touch driving electrodes TE neighboring each other in the second direction DR2 may be electrically connected to each other through bridge electrodes BE (e.g., see FIG. 7) extending in the second direction DR2.

Each of the touch driving electrodes TE and the receiving electrodes RE may surround (around a periphery of) a dummy electrode DE disposed in its center.

Each of the dummy electrodes DE may be spaced apart from a touch driving electrode TE or a receiving electrode RE surrounding (e.g., around a periphery of) the dummy electrode DE. The dummy electrodes DE may be kept in a floating state.

Although the touch driving electrodes TE, the receiving electrodes RE, and the dummy electrodes DE have a rhombic planar shape in FIG. 6, the present disclosure is not limited thereto. For example, the touch driving electrode TE, the receiving electrodes RE, and the dummy electrodes DE may have a quadrilateral shape other than a rhombus shape, a polygonal shape other than a quadrilateral shape, a circular shape, or an oval shape in a plan view.

Referring to FIG. 7, the bridge electrodes BE may be provided as a first sensor electrode layer SSEL1, and the touch driving electrodes TE and the receiving electrodes RE may be provided as a second sensor electrode layer SSEL2.

The touch driving electrodes TE and the receiving electrodes RE may be spaced apart from each other.

Although the bridge electrodes BE that are bent at least once are illustrated in FIG. 7, the shape of the bridge electrodes BE is not limited thereto.

The touch driving electrodes TE neighboring each other in the second direction DR2 may be electrically connected to each other through two or more bridge electrodes BE. In this case, the reliability of an electrical connection between the touch driving electrodes TE may be improved.

Although two bridge electrodes BE that are parallel to or substantially parallel to each other are disposed between the touch driving electrodes TE neighboring each other in the second direction DR2 in FIG. 7, the present disclosure is not limited thereto.

The bridge electrodes BE may be electrically connected to the touch driving electrodes TE through touch contact holes TCNT1.

The touch driving electrodes TE, the receiving electrodes RE, and the bridge electrodes BE may have a mesh or net structure in a plan view. The dummy electrodes DE may also have a mesh or net structure in a plan view. In this case, a width of a portion of each emission area EA that overlaps with a touch driving electrode TE, a receiving electrode RE, a dummy electrode DE, and/or a bridge electrode BE may be reduced. Accordingly, a decrease in light emission efficiency due to the touch driving electrodes TE, the receiving electrodes RE, the dummy electrodes DE, and the bridge electrodes BE may be reduced.

The emission areas EA may include the first emission areas EA1 for emitting light of the first color, the second emission areas EA2 for emitting light of the second color in a wavelength band lower than that of the first color, and the third emission areas EA3 for emitting light of the third color in a wavelength band lower than that of the second color. For example, the first color, second color, and third color may be red, green, and blue, respectively.

The first emission areas EA1 and the third emission areas EA3 may be alternately arranged along the first direction DR1 and the second direction DR2.

The second emission areas EA2 may neighbor the first emission areas EA1 and the third emission areas EA3, respectively, in a fourth direction DR4 and a fifth direction DR5. The second emission areas EA2 may be arranged side by side with one another in the first direction DR1 and the second direction DR2.

The fourth direction DR4 is a diagonal direction between the first direction DR1 and the second direction DR2. The fifth direction DR5 is a direction orthogonal to the fourth direction DR4. For example, the fourth direction DR4 may be a direction inclined by 45 degrees with respect to the first direction DR1.

Although each of the emission areas EA has a rhombic or rectangular planar shape in FIG. 7, the planar shape of each of the emission areas EA is not limited thereto. In other words, each of the emission areas EA may have a polygonal shape other than a quadrilateral shape, a circular shape, or an oval shape in a plan view.

As illustrated in FIG. 7, when the first color of the first emission areas EA1, the second color of the second emission areas EA2, and the third color of the third emission areas EA3 are red, green, and blue, respectively, the third emission areas EA3 may be wider than the first emission areas EA1, and the second emission areas EA2 may be narrower than the first emission areas EA1. However, the present disclosure is not limited thereto, and the width of each of the emission areas EA may be variously modified as needed or desired.

Referring to FIG. 8, the display panel 100 of the display device 10 according to an embodiment may include the substrate 110, the circuit layer 120 on the substrate 110, the light emitting element layer 130 on the circuit layer 120, the sealing layer 140 on the light emitting element layer 130, and the touch sensor layer 150 on the sealing layer 140.

The substrate 110 may include (e.g., may be made of) an insulating material such as a polymer resin. For example, the substrate 110 may include polyimide.

The circuit layer 120 may include the pixel drivers PXD corresponding to the emission areas EA, respectively.

Each of the pixel drivers PXD may include the driving transistor DT, and two or more transistors ST1 through ST6 electrically connected to the driving transistor DT.

According to an embodiment, each of the driving transistor DT and the two or more transistors ST1 through ST6 may include a channel region CA, a source region SA, and a drain region DA disposed in a first semiconductor layer, and a gate electrode GE disposed in a first gate conductive layer on a first gate insulating layer 122 covering the first semiconductor layer.

The source region SA and the drain region DA may be connected to opposite sides of the channel region CA, respectively. The source region SA and the drain region DA may have a higher conductivity than that of the channel region CA.

The gate electrode GE overlaps with the channel region CA.

The first capacitor PC1 of each of the pixel drivers PXD may be provided as an overlap area between the gate electrode GEDT of the driving transistor DT and a capacitor electrode CAE. The capacitor electrode CAE may be disposed in a second gate conductive layer on a second gate insulating layer 123 covering the first gate conductive layer.

The anode 131 of the light emitting element layer 130 may be electrically connected to the drain region DA6 of the sixth transistor ST6 through a first anode connection electrode ANDE1 and a second anode connection electrode ANDE2.

The first anode connection electrode ANDE1 may be disposed in a first source-drain conductive layer on a first interlayer insulating layer 124 covering the second gate conductive layer. The first anode connection electrode ANDE1 may be electrically connected to the drain region DA6 of the sixth transistor ST6 through a first anode contact hole ANCT1 penetrating the first interlayer insulating layer 124, the second gate insulating layer 123, and the first gate insulating layer 122.

The second anode connection electrode ANDE2 may be disposed in a second source-drain conductive layer on a first planarization layer 125 covering the first source-drain conductive layer. The second anode connection electrode ANDE2 may be electrically connected to the first anode connection electrode ANDE1 through a second anode contact hole ANCT2 penetrating the first planarization layer 125.

The anode 131 of the light emitting element layer 130 may be disposed on a second planarization layer 126 covering the second source-drain conductive layer. The anode 131 may be electrically connected to the second anode connection electrode ANDE2 through a third anode contact hole ANCT3 penetrating the second planarization layer 126.

In other words, the circuit layer 120 may include a buffer layer 121 disposed on the substrate 110, the first semiconductor layer (e.g., CADT, SADT, DADT, CA6, SA6 and DA6) disposed on the buffer layer 121, the first gate insulating layer 122 covering the first semiconductor layer, the first gate conductive layer (e.g., GEDT and GE6) disposed on the first gate insulating layer 122, the second gate insulating layer 123 covering the first gate conductive layer, the second gate conductive layer (e.g., CAE) disposed on the second gate insulating layer 123, the first interlayer insulating layer 124 covering the second gate conductive layer, the first source-drain conductive layer (e.g., ADNE1) disposed on the first interlayer insulating layer 124, the first planarization layer 125 covering the first source-drain conductive layer, the second source-drain conductive layer ANDE2 disposed on the first planarization layer 125, and the second planarization layer 126 covering the second source-drain conductive layer.

The second source-drain conductive layer may further include the data lines DL (e.g., see FIG. 11) for transmitting the data signals Vdata to the pixel drivers PXD.

Each of the buffer layer 121, the first gate insulating layer 122, the second gate insulating layer 123, and the first interlayer insulating layer 124 may include (e.g., may be made of) at least one inorganic layer. For example, each of the buffer layer 121, the first gate insulating layer 122, the second gate insulating layer 123, and the first interlayer insulating layer 124 may be multilayered in which one or more inorganic layers selected from among silicon nitride, silicon oxynitride, silicon oxide, titanium oxide, and aluminum oxide are alternately stacked.

Each of the first planarization layer 125 and the second planarization layer 126 may include (e.g., may be made of) an organic layer, such as an acryl resin, an epoxy resin, a phenolic resin, a polyamide resin, or a polyimide resin.

The first semiconductor layer may include (e.g., may be made of) one semiconductor material selected from among polycrystalline silicon, amorphous silicon, or an oxide semiconductor.

In the first semiconductor layer, the channel region CA overlapping with the gate electrode GE may maintain or substantially maintain semiconductor characteristics, and the source region SA and the drain region DA may become conductive.

Each of the first gate conductive layer, the second gate conductive layer, the first source-drain conductive layer, and the second source-drain conductive layer may be multilayered of two or more from among molybdenum (Mo), aluminum (Al), chromium (Cr), gold (Au), titanium (Ti), nickel (Ni), neodymium (Nd), and copper (Cu).

For example, each of the first gate conductive layer and the second gate conductive layer may be a single layer including molybdenum (Mo).

In addition, each of the first source-drain conductive layer and the second source-drain conductive layer may be triple layers of Ti/Al/Ti.

The light emitting element layer 130 includes the light emitting elements LEL corresponding to the emission areas EA, respectively.

Each of the light emitting elements LEL may include the anode 131 and the cathode 134 facing each other, and a light emitting layer 133 disposed between them. As another example, each of the light emitting elements LEL may further include a first common layer 135 disposed between the anode 131 and the light emitting layer 133, and a second common layer 136 disposed between the light emitting layer 133 and the cathode 134.

In other words, the light emitting element layer 130 may include the anodes 131 corresponding to the emission areas EA, respectively, a pixel defining layer 132 corresponding to the non-emission area NEA and covering edges of the anodes 131, the first common layers 135 disposed on the anodes 131, respectively, the light emitting layers 133 disposed on the first common layers 135, respectively, the second common layer 136 corresponding to the emission areas EA and disposed on the light emitting layers 133 and the pixel defining layer 132, and the cathode 134 disposed on the second common layer 136.

The anode 131 may be disposed for each of the emission areas EA, and may be electrically connected to the pixel driver PXD of the circuit layer 120. The anode 131 may be referred to as a pixel electrode.

The anode 131 may include (e.g., may be made of) a metal material having high reflectivity, such as a stacked structure of aluminum and titanium (e.g., Ti/Al/Ti), a stacked structure of aluminum and indium tin oxide (e.g., ITO/Al/ITO), an APC alloy, or a stacked structure of an APC alloy and indium tin oxide (e.g., ITO/APC/ITO). The APC alloy is an alloy of silver (Ag), palladium (Pd), and copper (Cu).

The first common layer 135 on the anode 131 may be disposed for each of the emission areas EA. The first common layer 135 may include a hole transport layer. As another example, the first common layer 135 may further include a hole injection layer between the anode 131 and the hole transport layer.

The light emitting layer 133 on the first common layer 135 may be disposed for each of the emission areas EA. The light emitting layer 133 of each first emission area EA1, the light emitting layer 133 of each second emission area EA2, and the light emitting layer 133 of each third emission area EA3 may include organic light emitting materials having different materials or contents from each other.

For example, the light emitting layer 133 may include (e.g., may be made of) an organic light emitting material that converts electron-hole pairs into light.

The organic light emitting material may include a host material and a dopant. The dopant may include a phosphorescent material or a fluorescent material.

The light emitting layer 133 of each first emission area EA1 for emitting light of the first color may include a host material of carbazole biphenyl (CBP) or 1,3-bis(carbazol-9-yl) (mCP).

In addition, a dopant of the light emitting layer 133 of each first emission area EA1 may include one or more phosphorescent materials selected from among bis(1-phenylisoquinoline)acetylacetonate iridium (PIQIr(acac)), bis(1-phenylquinoline)acetylacetonate iridium (PQIr(acac)), tris(1-phenylquinoline)iridium (PQIr), and octaethylporphyrin platinum (PtOEP), or may be a fluorescent material including PBD:Eu(DBM)3(Phen) or perylene.

The light emitting layer 133 of each second emission area EA2 for emitting light of the second color in a wavelength band lower than that of the first color may include a host material of CBP or mCP.

In addition, a dopant of the light emitting layer 133 of each second emission area EA2 may be a phosphorescent material including Ir(ppy)3(fac tris(2-phenylpyridine) iridium) or a fluorescent material including tris(8-hydroxyquinolino)aluminum (Alq3).

The light emitting layer 133 of each third emission area EA3 for emitting light of the third color in a wavelength band lower than that of the second color may include a host material of CBP or mCP.

A dopant of the light emitting layer 133 of each third emission area EA3 may be a phosphorescent material including (4,6-F2ppy)2Irpic or L2BD111.

The organic light emitting materials of the light emitting layer 133 described above is provided as an example, and the present disclosure is not limited thereto.

The second common layer 136 under the cathode 134 may be disposed for the entire display area DA including the emission areas EA. The second common layer 136 may include an electron transport layer. As another example, the second common layer 136 may further include an electron injection layer between the cathode 134 and the electron transport layer.

The cathode 134 may be disposed for the entire display area DA including the emission areas EA, and may be electrically connected to the second power line VSL (e.g., see FIG. 5). The cathode 134 may be referred to as a common electrode.

The cathode 134 may include (e.g., may be made of) a transparent conductive material (TCO) capable of transmitting light, such as ITO or IZO, or a semi-transmissive conductive material, such as magnesium (Mg), silver (Ag), or an alloy of Mg and Ag. When the cathode 134 includes (e.g., is made of) a semi-transmissive conductive material, an improvement in light output efficiency by a microcavity may be provided.

The sealing layer 140 may be disposed on the circuit layer 120, and may cover the light emitting element layer 130.

The sealing layer 140 may include a first sealing layer 141 disposed on the light emitting element layer 130 and made of an inorganic insulating material, a second sealing layer 142 disposed on the first sealing layer 141, overlapping with the light emitting element layer 130 and made of an organic insulating material, and a third sealing layer 143 disposed on the first sealing layer 141, covering the second sealing layer 142, and made of an inorganic insulating material.

The second sealing layer 142 may be made of an organic insulating material, such as an acryl resin, an epoxy resin, a phenolic resin, a polyamide resin, or a polyimide resin.

The second sealing layer 142 may be prepared by dropping an organic material in a liquid state onto the first sealing layer 141, spreading the organic material widely to cover the display area DA, and then curing the spread organic material.

Accordingly, the display panel 100 of the display device 10 may further include a dam DAM (e.g., see FIG. 11) for limiting a range in which the organic material of the second sealing layer 142 spreads. One or more dams DAM may be disposed in the non-display area NDA to surround (e.g., around a periphery of) the display area DA.

Because the second sealing layer 142 spreads only to the dams DAM, the third sealing layer 143 may contact the first sealing layer 141 in the non-display area NDA between edges of the substrate 110 and the dams DAM. Therefore, a sealing structure composed of inorganic materials that are bonded to each other may be provided.

Each of the first sealing layer 141 and the third sealing layer 143 may have a structure in which one or more inorganic layers selected from among a silicon nitride layer, a silicon oxynitride layer, a silicon oxide layer, a titanium oxide layer, and an aluminum oxide layer are stacked.

The touch sensor layer 150 may be disposed on the sealing layer 140.

The touch sensor layer 150 may include a first sensor insulating layer 151 covering the sealing layer 140, the first sensor electrode layer SSEL1 (e.g., see FIG. 7) disposed on the first sensor insulating layer 151 and including the bridge electrodes BE, a second sensor insulating layer 152 covering the first sensor electrode layer SSEL1, the second sensor electrode layer SSEL2 disposed on the second sensor insulating layer 152 and including the touch driving electrodes TE and the receiving electrodes RE, and a sensor planarization layer 153 evenly covering the second sensor electrode layer SSEL2.

Each of the first sensor insulating layer 151 and the second sensor insulating layer 152 may have a structure in which one or more inorganic layers selected from among a silicon nitride layer, a silicon oxynitride layer, a silicon oxide layer, a titanium oxide layer, and an aluminum oxide layer are stacked.

The second sensor insulating layer 152 may contact the third sealing layer 143 of the sealing layer 140 in the touch peripheral area TPA to block penetration of oxygen and/or moisture.

The sensor planarization layer 153 may include (e.g., may be made of) an organic material that may be disposed in a low-temperature process. For example, the sensor planarization layer 153 may include (e.g., may be made of) a negative photoresist material.

The first sensor electrode layer SSEL1 including the bridge electrodes BE may be a single layer or multilayers including (e.g., made of) any one or more of molybdenum (Mo), aluminum (Al), chromium (Cr), gold (Au), titanium (Ti), nickel (Ni), neodymium (Nd), copper (Cu), and suitable alloys thereof.

The second sensor electrode layer SSEL2 including the touch driving electrodes TE and the receiving electrodes RE may be a single layer or multilayers including (e.g., made of) any one or more of molybdenum (Mo), aluminum (Al), chromium (Cr), gold (Au), titanium (Ti), nickel (Ni), neodymium (Nd), copper (Cu), and suitable alloys thereof.

The second sensor electrode layer SSEL2 may further include the dummy electrode DE disposed inside each of the touch driving electrodes TE and the receiving electrodes RE, the first and second driving lines TL1 and TL2 connected to the touch driving electrodes TE, and the sensing lines RL connected to the receiving electrodes RE.

The touch driving electrodes TE may be electrically connected to the bridge electrodes BE through the touch contact holes TCNT1 penetrating the second sensor insulating layer 152.

The second sensor electrode layer SSEL2 including the touch driving electrodes TE, the receiving electrodes RE, the dummy electrodes DE, the first driving lines TL1, the second driving lines TL2, and the sensing lines RL may have a structure including a low reflection layer. In this case, the amount of external light emitted after being reflected inside the display panel 100 (e.g., the reflection of external light) may be reduced.

Figure 9:
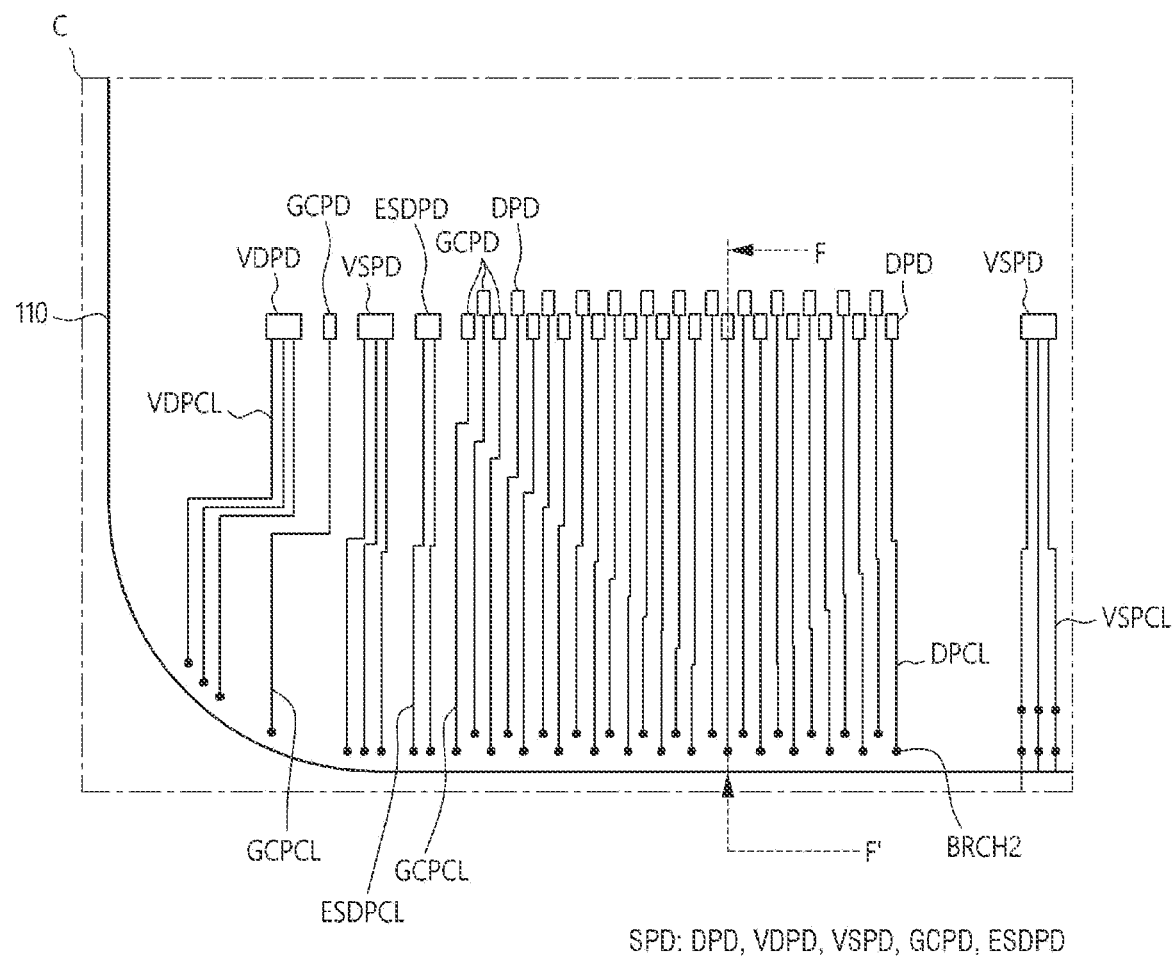
FIG. 9 is a layout view of the portion C of FIG. 2.

FIG. 9 is a layout view of the portion C of FIG. 2.

Referring to FIG. 9, the display panel 100 of the display device 10 according to an embodiment may further include signal pads SPD (e.g., DPD, VDPD, VSPD, GCPD and ESDPD) disposed on the second surface of the substrate 110 opposite to the display surface, and pad connection lines PCL (e.g., DPCL, VDPCL, VSPCL, GCPCL and ESDPCL) connected to the signal pads SPD, respectively.

The signal pads SPD include data pads DPD electrically connected to the display driving circuit 300.

In addition, the signal pads SPD may further include a first power pad VDPD for applying the first power ELVDD, a second power pad VSPD for applying the second power ELVSS, gate control pads GCPD for applying gate driving signals and a gate driving power to a gate driving circuit disposed in a gate driving circuit area GDRA (e.g., see FIG. 10) of the non-display area NDA, and an electrostatic control pad ESDPD for applying static electricity blocking control signals to static electricity blocking lines ESDSL.

The pad connection lines PCL include data pad connection lines DPCL connected to the data pads DPD, respectively.

In addition, the pad connection lines PCL may further include first power pad connection lines VDPCL connected to the first power pad VDPD, second power pad connection lines VSPCL connected to the second power pad VSPD, gate control pad connection lines GCPCL connected to the gate control pads GCPD, and electrostatic control pad connection lines ESDPCL connected to the electrostatic control pad ESDPD.

The pad connection lines PCL may extend between the signal pads SPD and second bridge connection holes BRCH2.

The second bridge connection holes BRCH2 may penetrate at least a portion of the substrate 110 and a portion of the circuit layer 120, and may be disposed adjacent to an edge of the substrate 110.

FIG. 10 is a layout view of the portion C of FIG. 1.

Referring to FIG. 10, the circuit layer 120 of the display panel 100 of the display device 10 according to an embodiment further includes data connection lines DCNL disposed in the non-display area NDA and electrically connected to the data lines DL, respectively, and data bridge lines DBRL electrically connected to the data connection lines DCNL, respectively.

The data lines DL of the display area DA may extend in the second direction DR2.

The data bridge lines DBRL may be disposed in a portion of the non-display area NDA between a dam DAM (e.g., see FIG. 11) and an edge of the substrate 110.

The data bridge lines DBRL may be disposed adjacent to an edge of the substrate 110 that faces one side of the display area DA in the second direction DR2, and may extend up to the edge of the substrate 110.

In other words, in a third direction DR3 in which the first and second surfaces of the substrate 110 face each other, an end of each of the data bridge lines DBRL may be aligned with the edge of the substrate 110.

The data connection lines DCNL may be electrically connected to ends of the data lines DL, respectively, and may be disposed in a portion of the non-display area NDA that is in contact with one side of the display area DA in the second direction DR2.

In other words, the data connection lines DCNL may extend in the second direction DR2 from the data lines DL to the data bridge lines DBRL.

In order to improve a floor area ratio of the non-display area NDA, at least some of the data connection lines DCNL may include one or more bent points.

The data bridge lines DBRL may be electrically connected to the data connection lines DCNL through first bridge connection holes BRCH1, respectively.

The data bridge lines DBRL may be electrically connected to the data pad connection lines DPCL through the second bridge connection holes BRCH2, respectively.

Therefore, the data lines DL of the display area DA may be electrically connected to the display driving circuit 300 mounted on the circuit board 200 through the data connection lines DCNL and the data bridge lines DBRL in the non-display area NDA, the data pad connection lines DPCL and the data pads DPD on the second surface of the substrate 110, and the circuit board 200.

In addition, the circuit layer 120 may further include a first power supply line VDSPL, a second power supply line VSSPL, gate control supply lines GCSPL, and the static electricity blocking lines ESDSL disposed in the non-display area NDA.

The first power supply line VDSPL may be disposed adjacent to at least a portion of an area around the display area DA, and may surround (e.g., around a periphery of) at least a portion of the display area DA.

The second power supply line VSSPL may be disposed adjacent to an area around the first power supply line VDSPL, and may surround (e.g., around a periphery of) at least a portion of the display area DA.

The first power supply line VDSPL may be electrically connected to the first power pad connection lines VDPCL through first power bridge lines VDBRL.

The second power supply line VSSPL may be electrically connected to the second power pad connection lines VSPCL through second power bridge lines VSBRL.

The gate control supply lines GCSPL may be electrically connected to the gate control pad connection lines GCPCL through gate control bridge lines GCBRL.

The gate control supply lines GCSPL may extend from the gate control bridge lines GCBRL to the gate driving circuit area GDRA.

The static electricity blocking lines ESDSL may be electrically connected to the electrostatic control pad connection lines ESDPCL through electrostatic control bridge lines ESDBRL.

The static electricity blocking lines ESDSL may transmit static electricity blocking control signals to diodes for blocking static electricity.

However, the present disclosure is not limited to the illustration of FIG. 10, and the arrangement of the first power supply line VDSPL, the second power supply line VSSPL, the gate control supply lines GCSPL, and the static electricity blocking lines ESDSL may be variously modified as needed or desired according to the elements disposed in, and the volume ratio of, the non-display area NDA.

FIG. 11 is a cross-sectional view taken along the line F-F' of FIGS. 9 and 10 according to the first embodiment.

Referring to FIG. 11, the substrate 110 of the display panel 100 of the display device 10 according to an embodiment may include a first support layer 111 including the display area DA and the non-display area NDA, a first barrier layer 112 covering a portion of the first support layer 111, a pad conductive layer PDCDL disposed on the first support layer 111 and the first barrier layer 112, a second barrier layer 113 covering the pad conductive layer PDCDL, and a second support layer 114 evenly covering the second barrier layer 113.

In other words, the substrate 110 according to an embodiment includes the first support layer 111 and the second support layer 114 facing each other, and the pad conductive layer PDCDL disposed between the first support layer 111 and the second support layer 114.

The first support layer 111 includes the second surface of the substrate 110 on which the circuit board 200 is disposed.

The second support layer 114 includes the first surface of the substrate 110 on which the circuit layer 120 is disposed.

The pad conductive layer PDCDL may include the signal pads SPD (e.g., DPD) disposed between the first support layer 111 and the second barrier layer 113, and the pad connection lines PCL (e.g., DPCL) disposed between the first barrier layer 112 and the second barrier layer 113 and connected to the signal pads SPD, respectively.

The signal pads SPD (e.g., DPD) may be exposed outside the substrate 110 by a substrate hole penetrating the first support layer 111, and the flexible board portion 220 of the circuit board 200 may be bonded to the signal pads SPD by the conductive adhesive member 230.

The circuit layer 120 may include the buffer layer 121 covering the substrate 110, the first gate insulating layer 122 covering the first semiconductor layer (e.g., CA, SA and DA of FIG. 8) on the buffer layer 121, the second gate insulating layer 123 covering the first gate conductive layer (e.g., GE of FIG. 8) on the first gate insulating layer 122, the first interlayer insulating layer 124 covering the second gate conductive layer (e.g., CAE of FIG. 8) on the second gate insulating layer 123, the first planarization layer 125 covering the first source-drain conductive layer (e.g., ANDE1 of FIG. 8) on the first interlayer insulating layer 124, and the second planarization layer 126 covering the second source-drain conductive layer (e.g., ANDE2 of FIG. 8) on the first planarization layer 125.

As illustrated in FIG. 11, the second source-drain conductive layer on the first planarization layer 125 may include the data lines DL of the display area DA.

The first gate conductive layer on the first gate insulating layer 122 or the second gate conductive layer on the second gate insulating layer 123 may include the data connection lines DCNL disposed in the non-display area NDA.

In other words, each of the data connection lines DCNL may be disposed in the first gate conductive layer on the first gate insulating layer 122 or the second gate conductive layer on the second gate insulating layer 123.

In other words, some of the data connection lines DCNL may be disposed in the first gate conductive layer on the first gate insulating layer 122, and other data connection lines DCNL may be disposed in the second gate conductive layer on the second gate insulating layer 123.

Therefore, some of the data lines DL may be electrically connected to some of the data connection lines DCNL, respectively, through data contact holes DCNH penetrating the first planarization layer 125, the first interlayer insulating layer 124, and the second gate insulating layer 123.

In addition, the other data lines DL may be electrically connected to the other data connection lines DCNL, respectively, through data contact holes DCNH penetrating the first planarization layer 125 and the first interlayer insulating layer 124.

According to an embodiment, each of the first power supply line VDSPL and the second power supply line VSSPL may be disposed in the first source-drain conductive layer on the first interlayer insulating layer 124 or the second source-drain conductive layer on the first planarization layer 125.

For example, each of the first power supply line VDSPL and the second power supply line VSSPL may be disposed in the second source-drain conductive layer on the first planarization layer 125.

As another example, each of the first power supply line VDSPL and the second power supply line VSSPL may be disposed in a combination of the first source-drain conductive layer and the second source-drain conductive layer.

According to an embodiment, the static electricity blocking lines ESDSL may be disposed in the first source-drain conductive layer on the first interlayer insulating layer 124.

However, the present disclosure is not limited thereto, and the arrangement of the first power supply line VDSPL, the second power supply line VSSPL, and the static electricity blocking lines ESDSL may be various modified according to the volume ratio of the non-display area NDA.

The dam DAM for limiting the range in which the second sealing layer 142 spreads may include a plurality of dam layers DML1 through DLM3 that are sequentially stacked on the first interlayer insulating layer 124.

For example, the dam DAM may include two or more of a first dam layer DML1 disposed in the same layer as that of the first planarization layer 125, a second dam layer DML2 disposed in the same layer as that of the second planarization layer 126, and a third dam layer DML3 disposed in the same layer as that of the pixel defining layer 132.

Because the second sealing layer 142 is disposed within an area defined by the dam DAM, the third sealing layer 143 may contact the first sealing layer 141 in an area between the dam DAM and an edge of the substrate 110.

Because the data lines DL are disposed in the second source-drain conductive layer on the first planarization layer 125, they may not extend beyond the dam DAM to the data bridge lines DBRL disposed on the edge of the substrate 110.

Accordingly, the data lines DL may be respectively electrically connected to the data bridge lines DBRL disposed on the edge of the substrate 110 through the data connection lines DCNL disposed in the first gate conductive layer or the second gate conductive layer disposed under the first interlayer insulating layer 124.

The data bridge lines DBRL may be electrically connected to the data connection lines DCNL through the first bridge connection holes BRCH1, respectively.

The first bridge connection holes BRCH1 may penetrate at least the first interlayer insulating layer 124 from among the first interlayer insulating layer 124 and the second gate insulating layer 123.

In other words, some of the data bridge lines DBRL may be respectively electrically connected to some of the data connection lines DCNL through first bridge connection holes BRCH1 penetrating the first interlayer insulating layer 124 and the second gate insulating layer 123.

In addition, the other data bridge lines DBRL may be respectively electrically connected to the other data connection lines DCNL through first bridge connection holes BRCH1 penetrating the first interlayer insulating layer 124.

The data bridge lines DBRL may be electrically connected to the data pad connection lines DPCL disposed in the pad conductive layer PDCDL embedded in the substrate 110 through the second bridge connection holes BRCH2.

Each of the second bridge connection holes BRCH2 may include a first through hole penetrating the first interlayer insulating layer 124, the second gate insulating layer 123, the first gate insulating layer 122, and the buffer layer 121, and a second through hole penetrating the second support layer 114 and the second barrier layer 113.

An end of each of the data bridge lines DBRL may be aligned with the edge of the substrate 110 in the third direction DR3. This may be the result from a process of separating the sub-area SBA to remove a lighting test driver.

Figure 12:
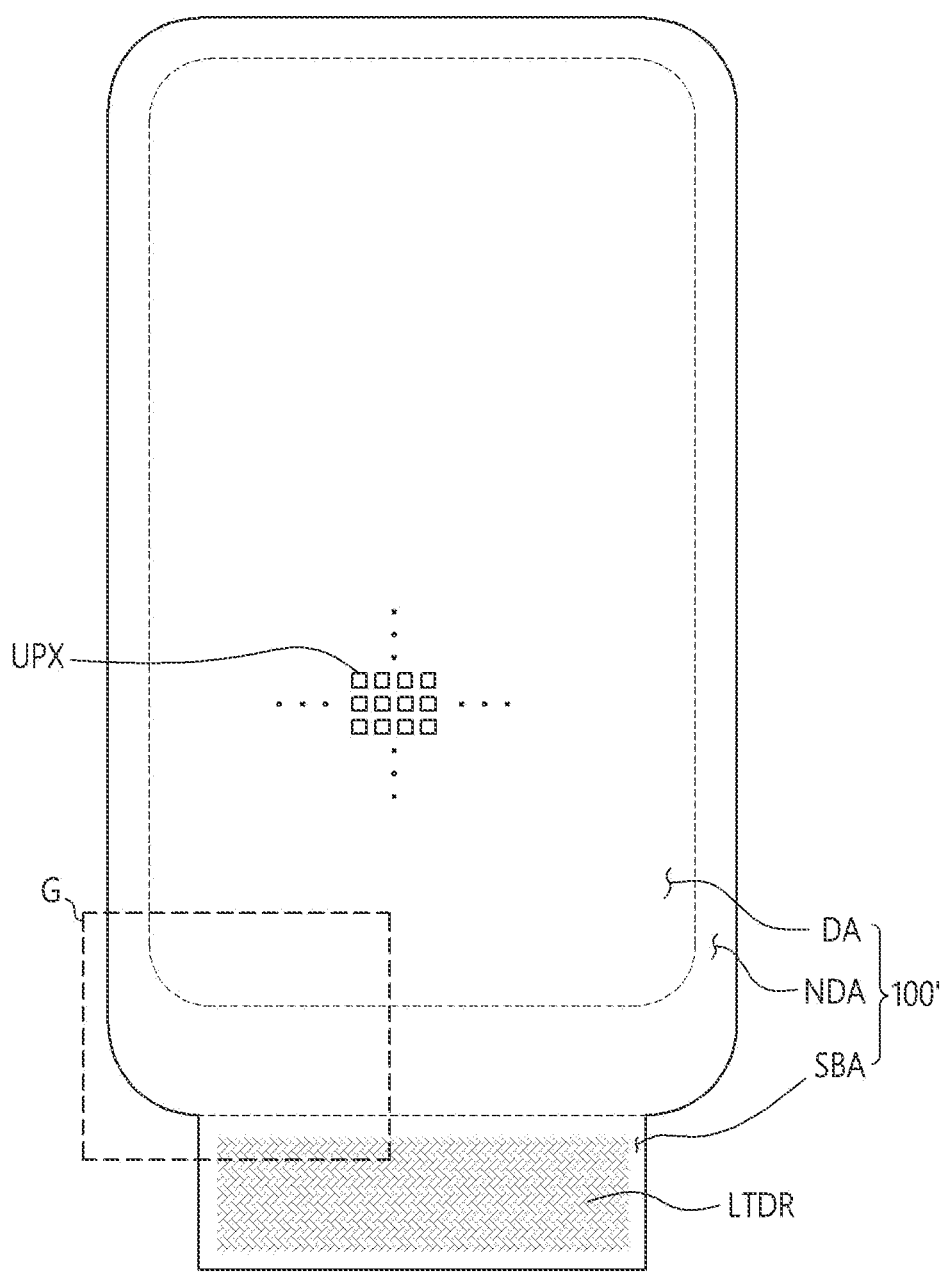
FIG. 12 is a plan view of a display device in an operation of performing a lighting test in a method of manufacturing the display device according to an embodiment.
Figure 13:
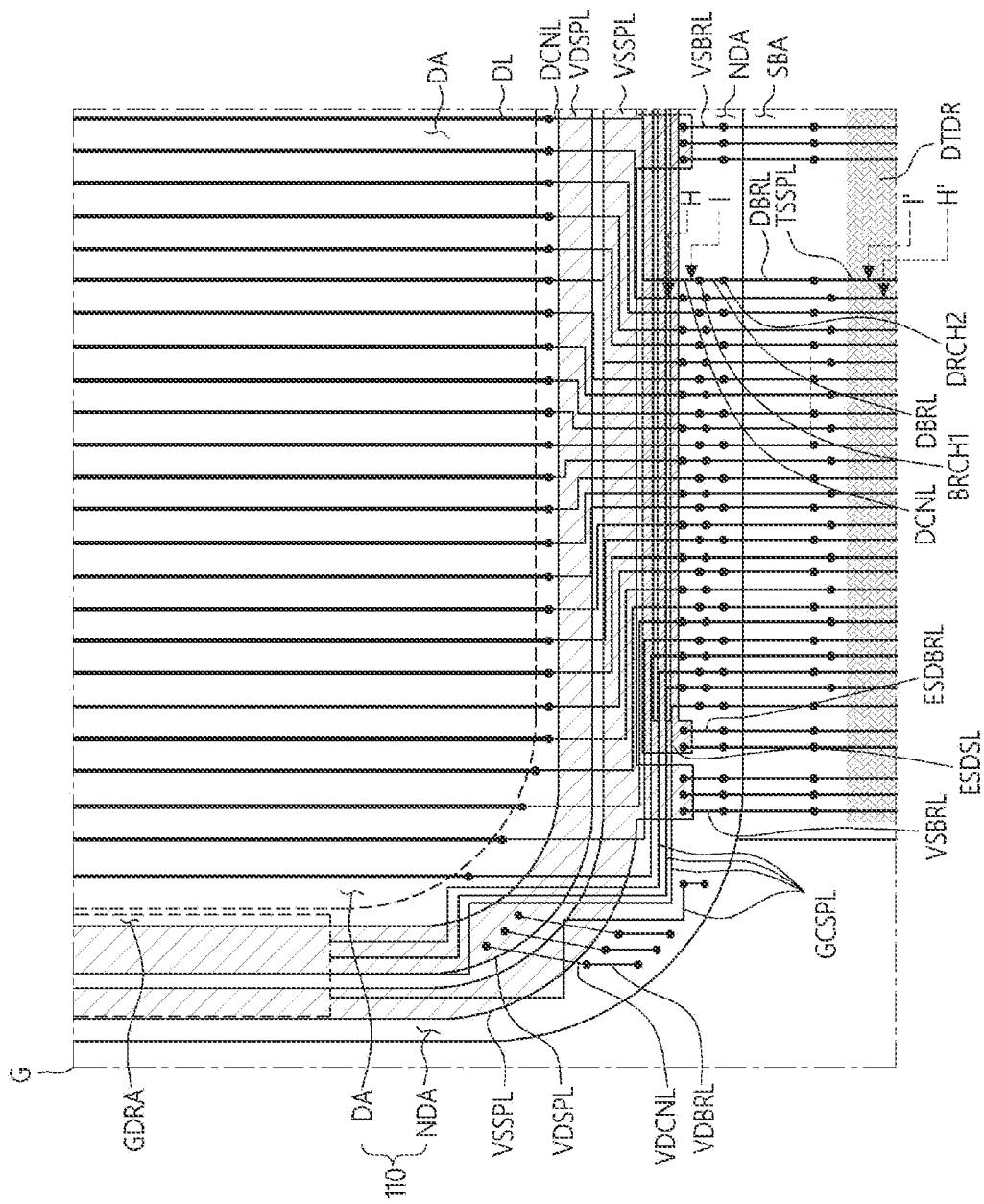
FIG. 13 is a layout view of the portion G of FIG. 12.

FIG. 12 is a plan view of a display device in an operation of performing a lighting test in a method of manufacturing the display device according to an embodiment. FIG. 13 is a layout view of the portion G of FIG. 12.

Referring to FIG. 12, the method of manufacturing the display device includes preparing a substrate 110', which includes a display area DA, a non-display area NDA, and a sub-area SBA extending from a portion of the non-display area NDA, placing a circuit layer 120, which includes pixel drivers PXD, data lines DL, and a lighting test driver LTDR, on a first surface of substrate 110', placing a light emitting element layer 130, which includes light emitting elements LEL respectively corresponding to emission areas EA, on the circuit layer 120, placing a sealing layer 140 on the light emitting element layer 130, performing a lighting test on the light emitting elements LEL using the lighting test driver LTDR, and separating the sub-area SBA from the non-display area NDA.

In the placing of the circuit layer 120, the lighting test driver LTDR is placed in the sub-area SBA and electrically connected to the data lines DL.

Accordingly, in the separating of the sub-area SBA from the non-display area NDA, the lighting test driver LTDR disposed in the sub-area SBA is removed from the circuit layer 120 together with the sub-area SBA.

In other words, according to an embodiment, after a lighting test is performed on the light emitting elements LEL by the lighting test driver LTDR disposed on the sub-area SBA of the substrate 110', the lighting test driver LTDR is removed together with the sub-area SBA. Therefore, it may be possible to perform a lighting test for reducing a defect rate, while preventing or substantially preventing an increase in the width of the non-display area NDA due to the presence of the lighting test driver LTDR. Thus, the width of the non-display area NDA may be reduced.

Referring to FIG. 13, in the placing of the circuit layer 120, the circuit layer 120 may further include the lighting test driver LTDR disposed in the sub-area SBA, and test signal supply lines TSSPL disposed in the sub-area SBA and electrically connected to the lighting test driver LTDR.

Data bridge lines DBRL may extend to the sub-area SBA, and may be electrically connected to the test signal supply lines TSSPL.

Therefore, the data bridge lines DBRL may electrically connect data connection lines DCNL and data pad connection lines DPCL to each other, respectively, as well as electrically connect the data connection lines DCNL and the test signal supply lines TSSPL to each other, respectively.

In other words, the data bridge lines DBRL may electrically connect the data connection lines DCNL, the data pad connection lines DPCL, and the test signal supply lines TSSPL to each other, respectively.

Figure 14:
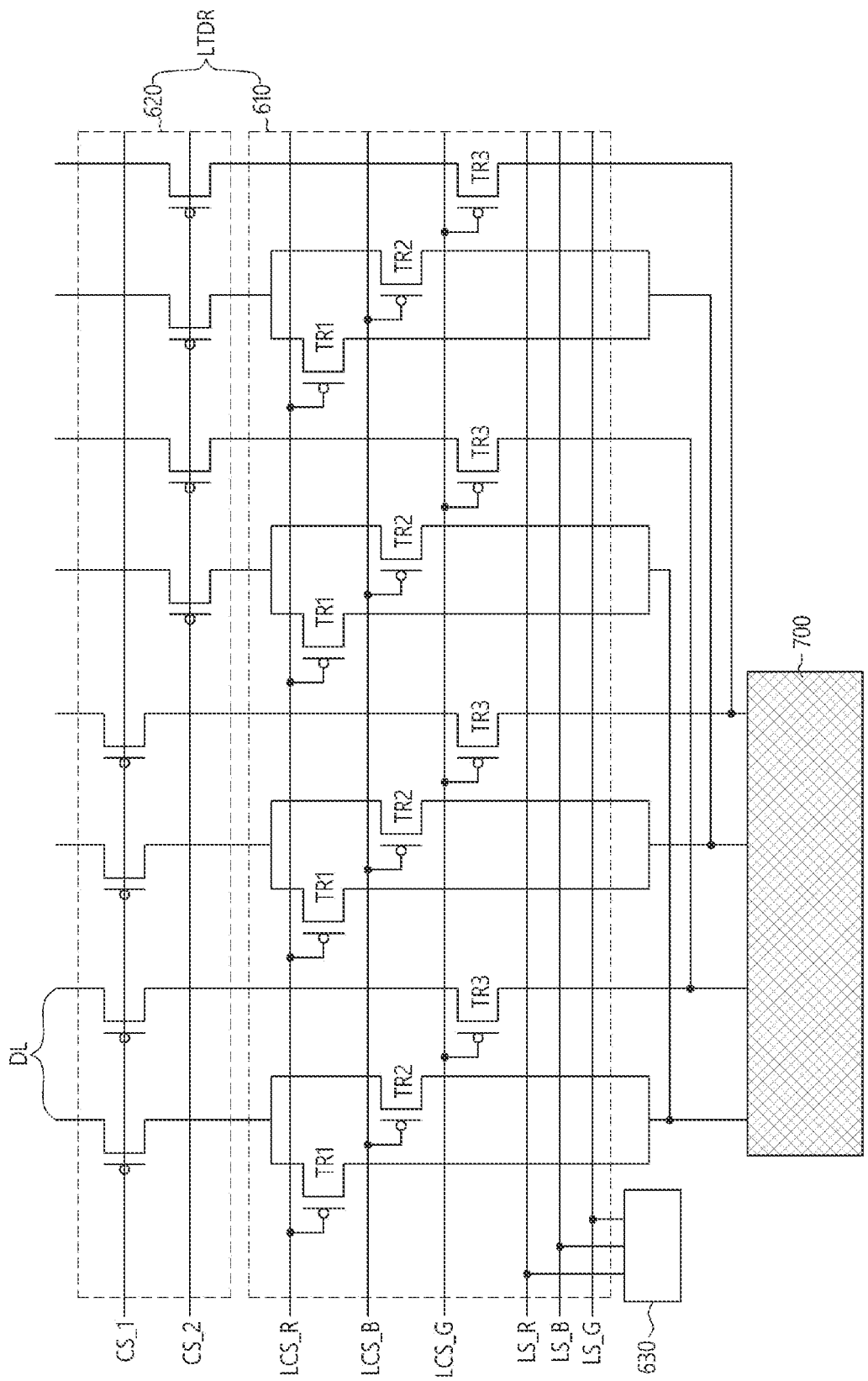
FIG. 14 is an equivalent circuit diagram of an example of a lighting test driver of FIG. 12.

FIG. 14 is an equivalent circuit diagram of an example of the lighting test driver LTDR of FIG. 12.

Referring to FIG. 14, the lighting test driver LTDR may include a test signal supply unit (e.g., a test signal supply circuit) 610 and a demultiplexer 620.

The test signal supply unit 610 may be electrically connected between the data lines DL and an external test device 700 for supplying a test signal.

The test signal supply unit 610 may include first test transistors TR1 connected between the data lines DL of first emission areas EA1 and the external test device 700, second test transistors TR2 connected between the data lines DL of third emission areas EA3 and the external test device 700, and third test transistors TR3 connected between the data lines DL of second emission areas EA2 and the external test device 700.

In addition, the test signal supply unit 610 may further include a first test gate control line LCS_R connected to gate electrodes of the first test transistors TR1, a second test gate control line LCS_B connected to gate electrodes of the second test transistors TR2, and a third test gate control line LCS_G connected to gate electrodes of the third test transistors TR3.

The demultiplexer 620 may include control transistors connected between the data lines DL and the test signal supply unit 610.

One first test transistor TR1 and one second test transistor TR2 may be connected to one control transistor.

One third test transistor TR3 may be connected to another control transistor.

The control transistors of the demultiplexer 620 may include first control transistors having gate electrodes that are connected to a first demux control line CS_1, and second control transistors having gate electrodes that are connected to a second demux control line CS_2.

According to an embodiment, the display device 100' before going through a lighting test may further include an antistatic circuit unit (e.g., antistatic circuit) 630 disposed in the sub-area SBA.

The antistatic circuit unit 630 may be connected to a first lighting test voltage supply line LS_R, a second lighting test voltage supply line LS_B, and a third lighting test voltage supply line LS_G. The antistatic circuit unit 630 may block static electricity generated by the first lighting test voltage supply line LS_R, the second lighting test voltage supply line LS_B, and the third lighting test voltage supply line LS_G from being transmitted to the test signal supply unit 610.

Figure 15:
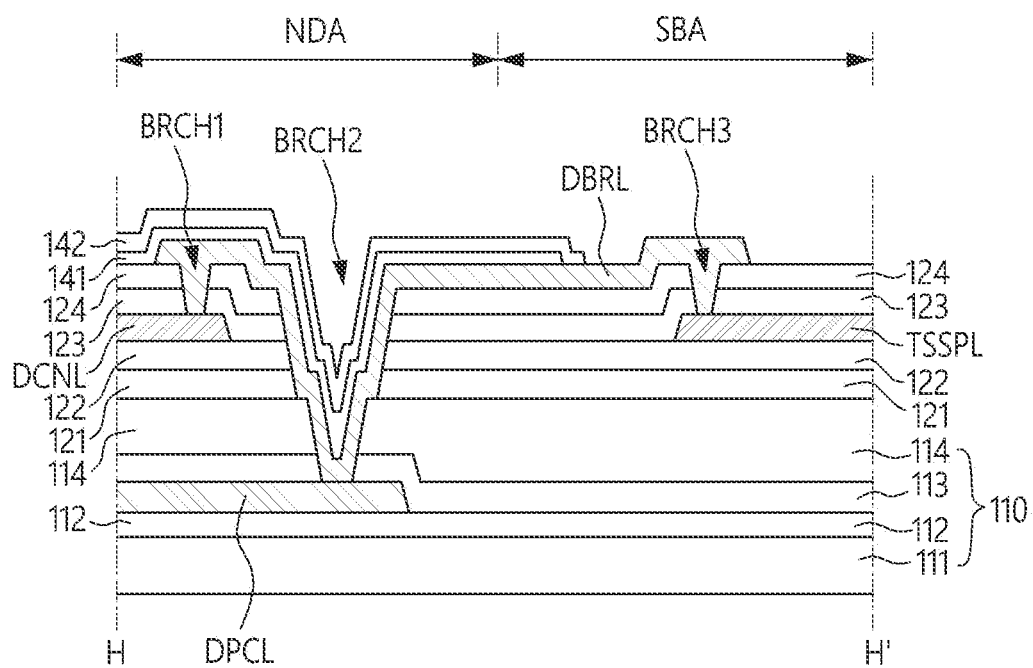
FIG. 15 is a cross-sectional view taken along the line H-H' of FIG. 13.
Figure 16:
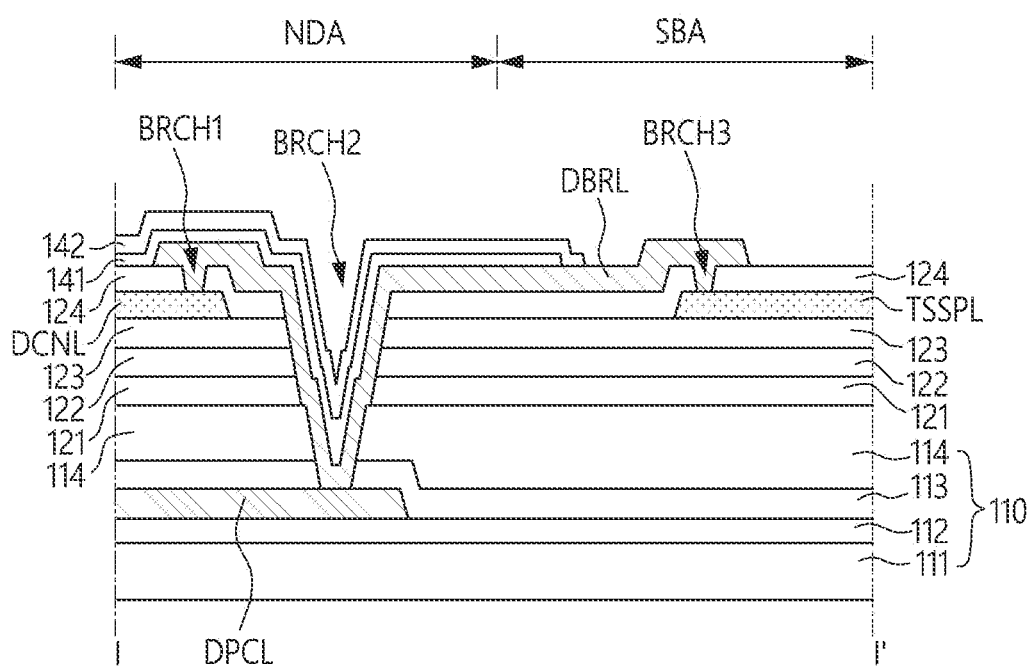
FIG. 16 is a cross-sectional view taken along the line I-I' of FIG. 13.

FIG. 15 is a cross-sectional view taken along the line H-H' of FIG. 13. FIG. 16 is a cross-sectional view taken along the line I-I' of FIG. 13.

Referring to FIG. 15, some of the data connection lines DCNL of the non-display area NDA may be disposed in a first gate conductive layer on a first gate insulating layer 122.

In addition, the data bridge lines DBRL may be disposed in a first source-drain conductive layer on a first interlayer insulating layer 124.

Accordingly, first bridge connection holes BRCH1 for electric connection between the data connection lines DCNL and the data bridge lines DBRL may penetrate the first interlayer insulating layer 124 and a second gate insulating layer 123.

The data bridge lines DBRL may be electrically connected to the data pad connection lines DPCL disposed between a first barrier layer 112 and a second barrier layer 113 of the substrate 110' through second bridge connection holes BRCH2.

Each of the second bridge connection holes BRCH2 may include a first through hole penetrating the first interlayer insulating layer 124, the second gate insulating layer 123, the first gate insulating layer 122, and a first buffer layer 121, and a second through hole penetrating a second support layer 114 and the second barrier layer 113.

The data bridge lines DBRL may extend to the sub-area SBA, and may be electrically connected to the test signal supply lines TSSPL of the sub-area SBA through third bridge connection holes BRCH3.

Some of the test signal supply lines TSSPL of the sub-area SBA may be disposed in the first gate conductive layer on the first gate insulating layer 122.

Accordingly, the third bridge connection holes BRCH3 may penetrate the first interlayer insulating layer 124 and the second gate insulating layer 123.

Referring to FIG. 16, the other data connection lines DCNL and the other test signal supply lines TSSPL may be disposed in a second gate conductive layer on the second gate insulating layer 123.

In this case, the first bridge connection holes BRCH1 for electrical connection between the data connection lines DCNL and the data bridge lines DBRL may penetrate only the first interlayer insulating layer 124.

In addition, the third bridge connection holes BRCH3 for electrical connection between the test signal supply lines TSSPL and the data bridge lines DBRL may penetrate only the first interlayer insulating layer 124.

Figure 17:
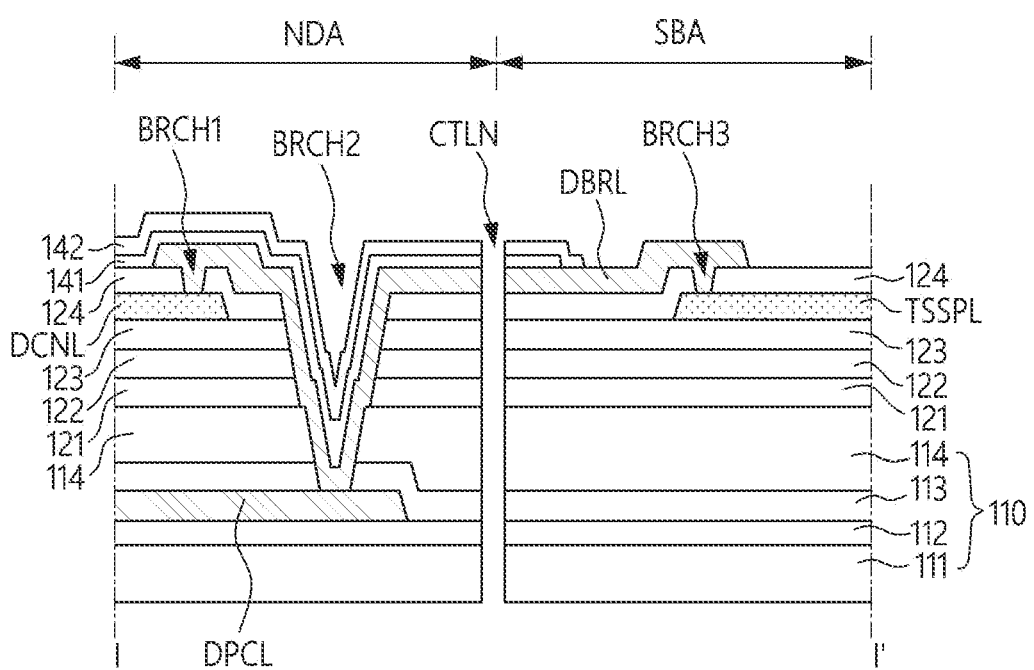
FIG. 17 is a cross-sectional view taken along the line I-I' of FIG. 13 in an operation of separating a sub-area from a non-display area in the method of manufacturing the display device according to an embodiment.

FIG. 17 is a cross-sectional view taken along the line I-I' of FIG. 13 in the operation of separating the sub-area SBA from the non-display area NDA in the method of manufacturing the display device according to an embodiment.

Referring to FIG. 17, in the operation of separating the sub-area SBA from the non-display area NDA after a lighting test is performed, the sub-area SBA may be separated from the non-display area NDA by performing laser irradiation or etching on a cutting line CTLN, which is a boundary between the non-display area NDA and the sub-area SBA. Accordingly, the lighting test driver LTDR disposed in the sub-area SBA may be removed from the circuit layer 120.

Here, because the data bridge lines DBRL are separated along the cutting line CTLN, ends of the data bridge lines DBRL may be aligned with the substrate 110 at an edge of the non-display area NDA.

Accordingly, in the first embodiment, the ends of the data bridge lines DBRL may be exposed together with a side surface of the substrate 110.

Figure 18:
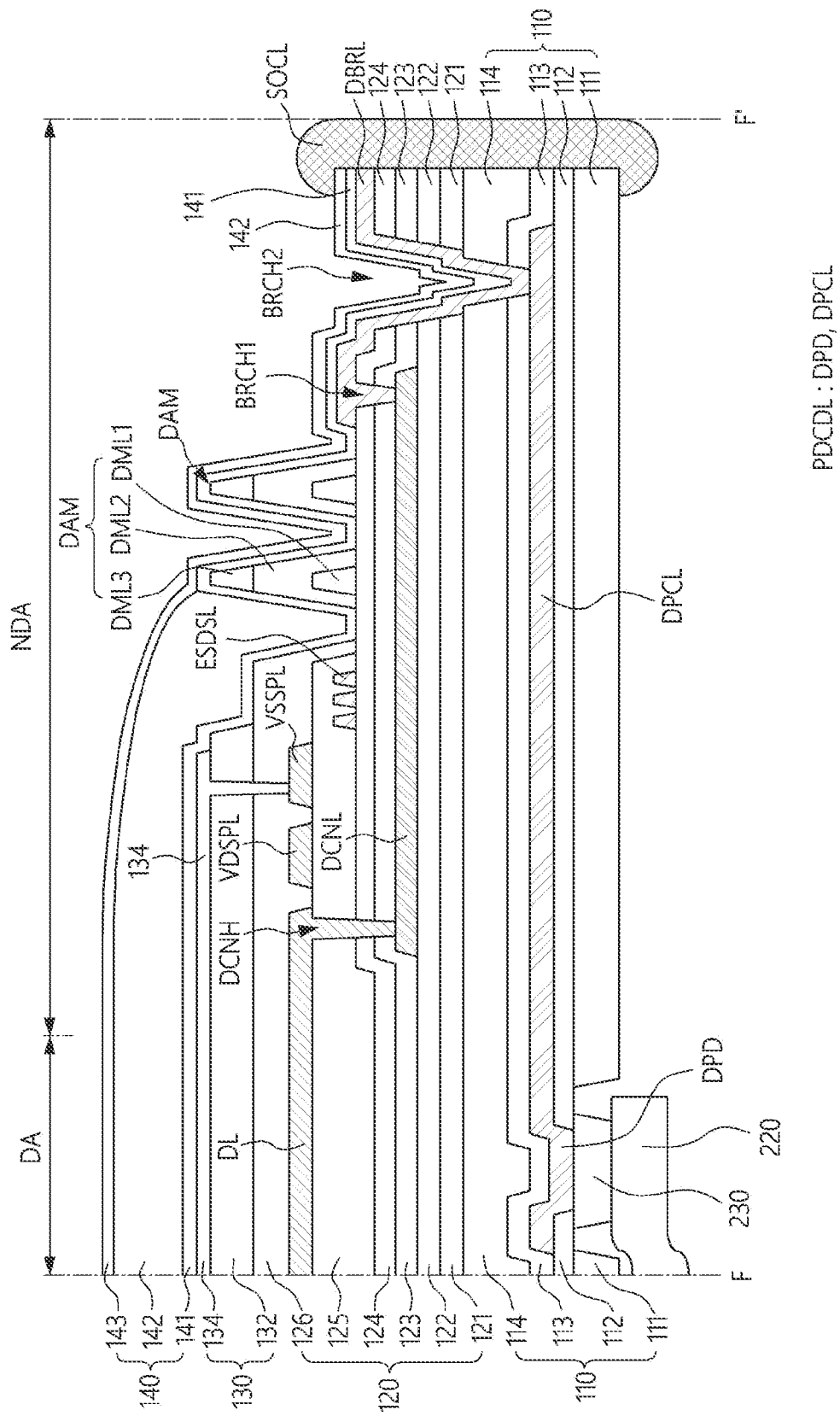
FIG. 18 is a cross-sectional view taken along the line F-F' of FIGS. 9 and 10 according to a second embodiment.

FIG. 18 is a cross-sectional view taken along the line F-F' of FIGS. 9 and 10 according to a second embodiment.

A display device 10 according to the second embodiment is the same or substantially the same as that of the first embodiment illustrated in FIG. 11, except that the display device 10 of FIG. 18 further includes a side overcoat layer SOCL covering an edge of the substrate 110 aligned with ends of the data bridge lines DBRL, an edge of the circuit layer 120, and an edge of the sealing layer 140. Therefore, redundant description thereof may not be repeated.

The side overcoat layer SOCL may include (e.g., may be made of) an insulating resin or the like.

According to the second embodiment, because the ends of the data bridge lines DBRL aligned with the edge of the substrate 110 are covered by the side overcoat layer SOCL, the data bridge lines DBRL may be prevented or substantially prevented from being corroded (e.g., from being easily corroded).

Figure 20:
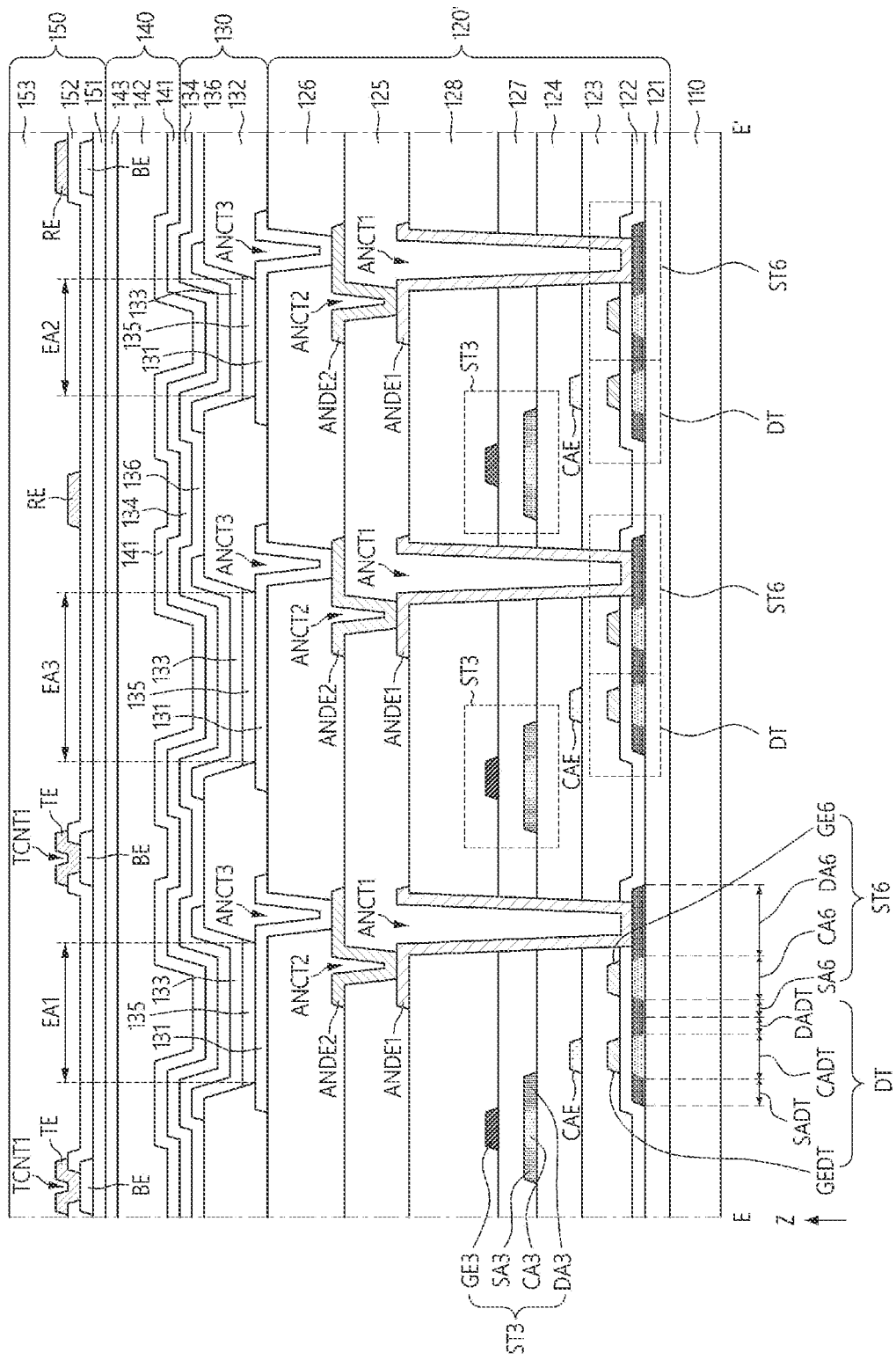
FIG. 20 is a cross-sectional view taken along the line E-E' of FIG. 7 according to a third embodiment.
Figure 21:
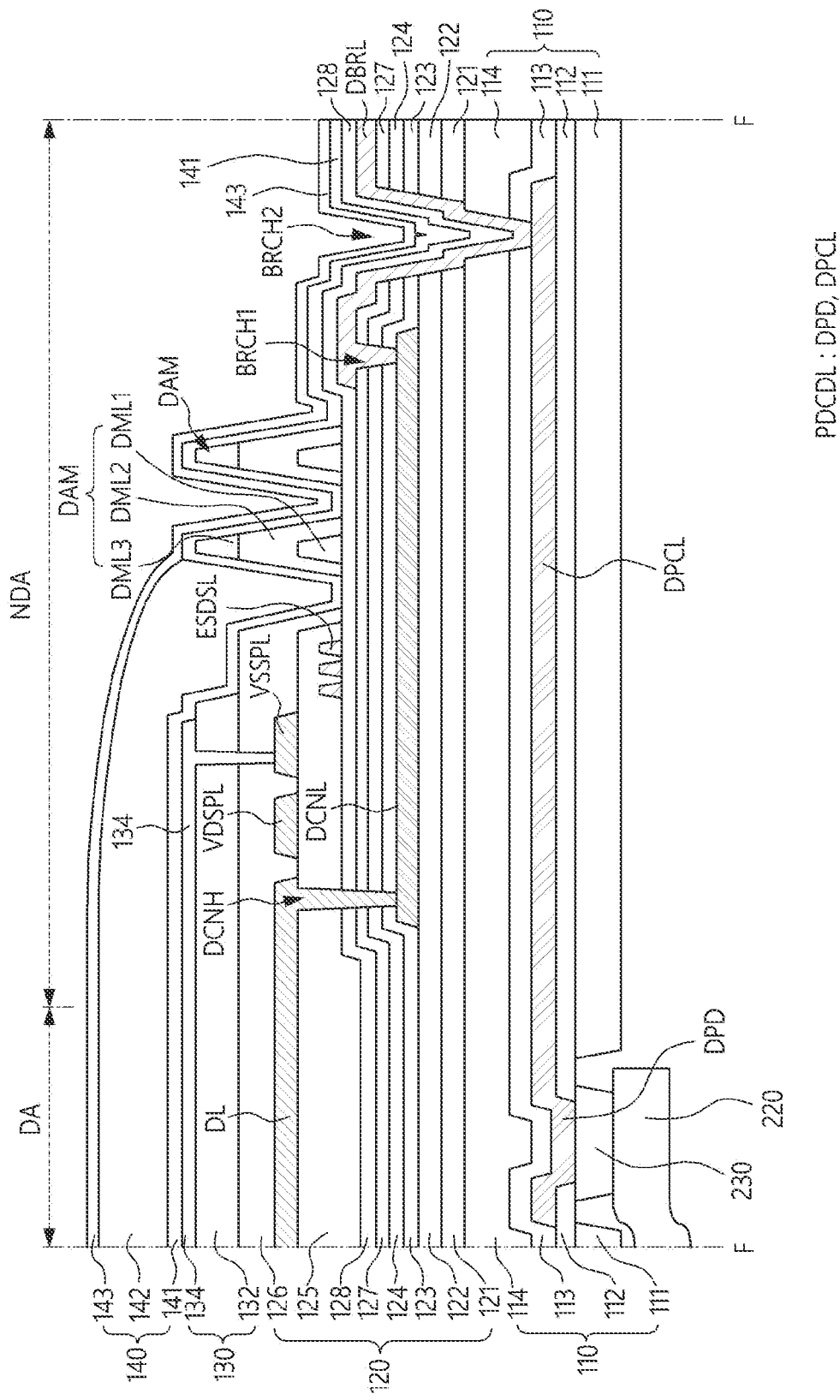
FIG. 21 is a cross-sectional view taken along the line F-F' of FIGS. 9 and 10 according to the third embodiment.

FIG. 19 is an equivalent circuit diagram of another example of a pixel driver PXD corresponding to one of the emission areas EA of FIG. 4. FIG. 20 is a cross-sectional view taken along the line E-E' of FIG. 7 according to a third embodiment. FIG. 21 is a cross-sectional view taken along the line F-F' of FIGS. 9 and 10 according to the third embodiment.

FIG. 5 illustrates a case where the driving transistor DT and the first through sixth transistors ST1 through ST6 included in the pixel driver PXD are all N-type MOSFETs. However, the present disclosure is not limited thereto.

For example, as illustrated in FIG. 19, a pixel driver PXD' according to another embodiment may include at least one P-type MOSFET.

Referring to FIG. 19, from among the switching elements included in the pixel driver PXD', the driving transistor DT, the second transistor ST2, the fourth transistor ST4, the fifth transistor ST5, and the sixth transistor ST6 may be provided as P-type MOSFETs having an active layer of a polysilicon semiconductor material. The first transistor ST1 and the third transistor ST3 may be provided as N-type MOSFETs having an active layer of an oxide semiconductor material.

In this case, because the first transistor ST1 is not turned on by the same signal as a signal for turning on the second transistor ST2, a gate electrode of the first transistor ST1 may be connected to the gate control line GCL together with the gate electrode of the fourth transistor ST4. Accordingly, the fourth transistor ST4 may be turned on while the gate control signal GC of the gate control line GCL is supplied at a low level, and the first transistor ST1 may be turned on while the gate control signal GC of the gate control line GCL is supplied at a high level.

In addition, the third transistor ST3 may be turned on while the scan initialization signal GI of the scan initialization line GIL is supplied at a high level.

In this case, as illustrated in FIG. 20, the switching elements provided as P-type MOSFETs and the switching elements provided as N-type MOSFETs may include active layers of different semiconductor materials from each other. Accordingly, the width of the pixel driver PXD' may be reduced, which may be advantageous for improving a resolution.

Referring to FIG. 20, a circuit layer 120' of a display panel 100 of the display device 10 according to the third embodiment is the same or substantially the same as the circuit layer 120 of the first embodiment of FIG. 8, except that it further includes a second semiconductor layer (e.g., CA3, SA3 and DA3) disposed on a first interlayer insulating layer 124, a third gate insulating layer 127 covering the second semiconductor layer, a third gate conductive layer (e.g., GE3) disposed on the third gate insulating layer 127, a second interlayer insulating layer 128 covering the third gate conductive layer, and a first source-drain conductive layer disposed on the second interlayer insulating layer 128. Therefore, redundant description thereof may not be repeated.

Each of the third gate insulating layer 127 and the second interlayer insulating layer 128 may include (e.g., may be made of) at least one inorganic layer. For example, each of the third gate insulating layer 127 and the second interlayer insulating layer 128 may be multilayers in which one or more inorganic layers selected from among silicon nitride, silicon oxynitride, silicon oxide, titanium oxide, and aluminum oxide are alternately stacked.

The third gate conductive layer may be multilayers of two or more of molybdenum (Mo), aluminum (Al), chromium (Cr), gold (Au), titanium (Ti), nickel (Ni), neodymium (Nd), and copper (Cu).

According to the third embodiment, the third transistor ST3 may include a channel region CA3, a source region SA3, and a drain region DA3 disposed in the second semiconductor layer on the first interlayer insulating layer 124, and a gate electrode GE3 disposed in the third gate conductive layer on the third gate insulating layer 127.

Because the first transistor ST1 provided as an N-type MOSFET together with the third transistor ST3 has the same or substantially the same structure as that of the third transistor ST3, redundant description thereof may not be repeated.

In addition, the switching elements excluding the first transistor ST1 and the third transistor ST3 from among the switching elements DT and ST1 through ST6 included in the pixel driver PXD' may be provided as P-type MOSFETs, and may each include a channel region CA, a source region SA and a drain region DA disposed in a first semiconductor layer on a buffer layer 121.

Referring to FIG. 21, the third gate conductive layer on the third gate insulating layer 127 may further include data bridge lines DBRL in a non-display area NDA.

In this case, first bridge connection holes BRCH1 for electrical connection between the data bridge lines DBRL and data connection lines DCNL may penetrate at least the third gate insulating layer 127 and the first interlayer insulating layer 124 from among the third gate insulating layer 127, the first interlayer insulating layer 124, and a second gate insulating layer 123.

In addition, each of second bridge connection holes BRCH2 for electrical connection between the data bridge lines DBRL and data pad connection lines DPCL may include a first through hole penetrating the third gate insulating layer 127, the first interlayer insulating layer 124, the second gate insulating layer 123, a first gate insulating layer 122, and the buffer layer 121, and a second through hole penetrating a second support layer 114 and a second barrier layer 113.

In addition, the data bridge lines DBRL may be covered with the second interlayer insulating layer 128. Thus, the data bridge lines DBRL may be protected by the second interlayer insulating layer 128 before a first sealing layer 141 and a third sealing layer 143 of a sealing layer 140 are disposed.

As described above, in the method of manufacturing the display device according to one or more embodiments of the present disclosure, after a lighting test is performed in a state where the circuit layer 120 including the lighting test driver LTDR in the sub-area SBA is placed, the lighting test driver LTDR is removed from the circuit layer 120 by separating the sub-area SBA from the non-display area NDA.

Therefore, it may be possible to perform a lighting test for reducing a defect rate, while preventing or substantially preventing an increase in the width of the non-display area NDA due to the presence of the lighting test driver LTDR.

A method of manufacturing a display device according to an embodiment includes preparing a substrate that includes a display area, a non-display area, and a sub-area, placing a circuit layer, which includes pixel drivers respectively corresponding to emission areas of the display area, data lines for transmitting data signals to the pixel drivers, and a lighting test driver electrically connected to the data lines, on the substrate, placing a light emitting element layer, which includes light emitting elements respectively corresponding to the emission areas, on the circuit layer, performing a lighting test on the light emitting elements using the lighting test driver, and separating the sub-area from the non-display area. In the separating of the sub-area from the non-display area, the lighting test driver disposed in the sub-area is removed from the circuit layer.

According to an embodiment, the substrate may include a first support layer, a first barrier layer disposed on a portion of the first support layer, a pad conductive layer disposed on the first support layer and the first barrier layer, a second barrier layer covering the pad conductive layer, and a second support layer evenly covering the second barrier layer. The pad conductive layer may include signal pads disposed between the first support layer and the second barrier layer, and pad connection lines disposed between the first barrier layer and the second barrier layer and respectively connected to the signal pads. The pad connection lines may include data pad connection lines respectively connected to data pads, which are some of the signal pads.

The circuit layer may further include data connection lines disposed in the non-display area and electrically connected to the data lines, respectively, test signal supply lines disposed in the sub-area and electrically connected to the lighting test driver, and data bridge lines electrically connecting the data connection lines, the test signal supply lines, and the data pad connection lines to each other, respectively.

In other words, one of the data connection lines may be electrically connected to one test signal supply line disposed in the sub-area and one data pad connection line disposed between the first barrier layer and the second barrier layer of the substrate through one data bridge line.

Therefore, because the data lines are electrically connected to the lighting test driver of the sub-area through the data connection lines, the data bridge lines, and the test signal supply lines, a lighting test may be performed.

When the sub-area is separated from the non-display area after the lighting test is performed, the lighting test driver disposed in the sub-area may be removed from the circuit layer.

In this case, the data bridge lines are cut by a cutting line for separating the non-display area and the sub-area from each other.

Therefore, according to one or more embodiments, after the separating of the sub-area from the non-display area, a cross-section of each of the data bridge lines may be aligned with an edge of the substrate from which the sub-area has been removed.

As described above, according to one or more embodiments of the present disclosure, after a lighting test is performed while the lighting test driver is disposed in the sub-area, the lighting test driver of the sub-area is removed. Accordingly, it may be possible to perform a lighting test, while preventing or substantially preventing an increase in the width of the non-display area due to the lighting test driver. Therefore, the width of the non-display area may be reduced.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
    a substrate comprising:
        a display area comprising emission areas; and
        a non-display area around the display area;
    a circuit layer on a first surface of the substrate, and comprising pixel drivers corresponding to the emission areas, respectively, and data lines configured to transmit data signals to the pixel drivers;
    a circuit board on a second surface of the substrate opposite to the first surface; and
    a display driving circuit on the circuit board, and configured to supply the data signals of the data lines,
    wherein the substrate comprises:
        a first support layer and a second support layer facing each other; and
        a pad conductive layer between the first support layer and the second support layer, and comprising signal pads connected to the circuit board, and pad connection lines connected to the signal pads, respectively,
    wherein the signal pads comprise data pads electrically connected to the display driving circuit,
    wherein the pad connection lines comprise data pad connection lines connected to the data pads, respectively,
    wherein the circuit layer further comprises:
        data connection lines in the non-display area, and electrically connected to the data lines, respectively; and
        data bridge lines electrically connecting the data pad connection lines and the data connection lines to each other, respectively, and
    wherein an end of each of the data bridge lines is aligned with an edge of the substrate.

2. The display device of claim 1, wherein:
    the second support layer comprises the first surface of the substrate;
    the first support layer comprises the second surface of the substrate;
    the substrate further comprises:
        a first barrier layer on a surface of the first support layer opposite to the second surface; and
        a second barrier layer on a surface of the second support layer opposite to the first surface;
    the pad connection lines are located between the first barrier layer and the second barrier layer;
    the signal pads are located between the second barrier layer and the first support layer; and
    the circuit board is connected to the signal pads through a substrate hole penetrating the first support layer.

3. The display device of claim 2, wherein the circuit layer comprises:
    a buffer layer on the substrate;
    a first semiconductor layer on the buffer layer;
    a first gate insulating layer covering the first semiconductor layer;
    a first gate conductive layer on the first gate insulating layer;
    a second gate insulating layer covering the first gate conductive layer;
    a second gate conductive layer on the second gate insulating layer;
    a first interlayer insulating layer covering the second gate conductive layer;
    a first source-drain conductive layer on the first interlayer insulating layer;

a first planarization layer covering the first source-drain conductive layer;
a second source-drain conductive layer on the first planarization layer; and
a second planarization layer covering the second source-drain conductive layer,
wherein the second source-drain conductive layer comprises the data lines.

4. The display device of claim 3, wherein each of the data connection lines is located in one of the first gate conductive layer or the second gate conductive layer.

5. The display device of claim 4, wherein:
the first source-drain conductive layer comprises the data bridge lines; and
the data bridge lines are electrically connected to the data connection lines, respectively, through first bridge connection holes penetrating at least the first interlayer insulating layer from among the first interlayer insulating layer and the second gate insulating layer.

6. The display device of claim 5, wherein:
the data bridge lines are electrically connected to the data pad connection lines through second bridge connection holes, respectively; and
each of the second bridge connection holes comprises:
a first through hole penetrating the first interlayer insulating layer, the second gate insulating layer, the first gate insulating layer, and the buffer layer; and
a second through hole penetrating the second support layer and the second barrier layer.

7. The display device of claim 4, wherein:
the circuit layer further comprises:
a second semiconductor layer on the first interlayer insulating layer;
a third gate insulating layer covering the second semiconductor layer;
a third gate conductive layer on the third gate insulating layer; and
a second interlayer insulating layer covering the third gate conductive layer,
the first source-drain conductive layer is on the second interlayer insulating layer;
the third gate conductive layer comprises the data bridge lines; and
the data bridge lines are electrically connected to the data connection lines, respectively, through first bridge connection holes penetrating at least the third gate insulating layer and the first interlayer insulating layer from among the third gate insulating layer, the first interlayer insulating layer, and the second gate insulating layer.

8. The display device of claim 1, further comprising:
a light emitting element layer on the circuit layer, and comprising light emitting elements corresponding to the emission areas, respectively;
a sealing layer on the circuit layer, and covering the light emitting element layer; and
a side overcoat layer covering the edge of the substrate aligned with the ends of the data bridge lines, an edge of the circuit layer, and an edge of the sealing layer.

9. A method of manufacturing a display device, comprising:
preparing a substrate to include a display area comprising emission areas, a non-display area around the display area, and a sub-area extending from a portion of the non-display area;
placing a circuit layer on a first surface of the substrate, the circuit layer comprising pixel drivers corresponding to the emission areas, respectively, data lines configured to transmit data signals to the pixel drivers, and a lighting test driver electrically connected to the data lines;
placing a light emitting element layer on the circuit layer, the light emitting element layer comprising light emitting elements corresponding to the emission areas, respectively;
placing a sealing layer on the light emitting element layer;
performing a lighting test on the light emitting elements using the lighting test driver; and
separating the sub-area from the non-display area,
wherein in the separating of the sub-area from the non-display area, the sub-area is removed from the substrate, and the lighting test driver in the sub-area is removed from the circuit layer,
wherein the substrate comprises:
a first support layer comprising the display area, the non-display area, and the sub-area;
a first barrier layer covering a portion of the first support layer;
a pad conductive layer on the first support layer and the first barrier layer;
a second barrier layer covering the pad conductive layer; and
a second support layer covering the second barrier layer, and
wherein:
the second support layer comprises the first surface of the substrate; and
the pad conductive layer comprises:
signal pads between the first support layer and the second barrier layer; and
pad connection lines between the first barrier layer and the second barrier layer, and connected to the signal pads, respectively.

10. The method of claim 9, wherein:
the pad connection lines comprise data pad connection lines connected to data pads from among the signal pads, respectively; and
in the placing of the circuit layer, the circuit layer further comprises:
data connection lines in the non-display area, and electrically connected to the data lines, respectively;
test signal supply lines in the sub-area, and electrically connected to the lighting test driver; and
data bridge lines electrically connecting the data connection lines, the test signal supply lines, and the data pad connection lines to each other, respectively.

11. The method of claim 10, wherein the circuit layer comprises:
a buffer layer on the second support layer;
a first semiconductor layer on the buffer layer;
a first gate insulating layer covering the first semiconductor layer;
a first gate conductive layer on the first gate insulating layer;
a second gate insulating layer covering the first gate conductive layer;
a second gate conductive layer on the second gate insulating layer;
a first interlayer insulating layer covering the second gate conductive layer;
a first source-drain conductive layer on the first interlayer insulating layer;
a first planarization layer covering the first source-drain conductive layer;

a second source-drain conductive layer on the first planarization layer; and a second planarization layer covering the second source-drain conductive layer, and wherein:

the second source-drain conductive layer comprises the data lines;

each of the data connection lines is located in one of the first gate conductive layer or the second gate conductive layer; and each of the test signal supply lines is located in one of the first gate conductive layer or the second gate conductive layer.

12. The method of claim 11, wherein:

the first source-drain conductive layer comprises the data bridge lines;

the data bridge lines are electrically connected to the data connection lines, respectively, through first bridge connection holes penetrating at least the first interlayer insulating layer from among the first interlayer insulating layer and the second gate insulating layer;

the data bridge lines are electrically connected to the data pad connection lines, respectively, through second bridge connection holes;

the data bridge lines are electrically connected to the test signal supply lines, respectively, through third bridge connection holes penetrating at least the first interlayer insulating layer from among the first interlayer insulating layer and the second gate insulating layer; and each of the second bridge connection holes comprises:

a first through hole penetrating the first interlayer insulating layer, the second gate insulating layer, the first gate insulating layer, and the buffer layer; and a second through hole penetrating the second support layer and the second barrier layer.

13. The method of claim 11, wherein the circuit layer further comprises:

a second semiconductor layer on the first interlayer insulating layer;

a third gate insulating layer covering the second semiconductor layer;

a third gate conductive layer on the third gate insulating layer; and a second interlayer insulating layer covering the third gate conductive layer, and wherein:

the first source-drain conductive layer is on the second interlayer insulating layer;

the third gate conductive layer comprises the data bridge lines; and the data bridge lines are electrically connected to the data connection lines, respectively, through first bridge connection holes penetrating at least the third gate insulating layer and the first interlayer insulating layer from among the third gate insulating layer, the first interlayer insulating layer, and the second gate insulating layer.

14. The method of claim 11, wherein after the separating of the sub-area from the non-display area, the method further comprises:

placing a circuit board under the first support layer, the circuit board comprising a display driving circuit thereon for supplying the data signals of the data lines; and electrically connecting the circuit board to the signal pads through a substrate hole penetrating the first support layer.

15. The method of claim 11, wherein after the separating of the sub-area from the non-display area, an end of each of the data bridge lines is aligned with an edge of the substrate.

16. The method of claim 15, wherein after the separating of the sub-area from the non-display area, the method further comprises placing a side overcoat layer to cover the edge of the substrate aligned with the ends of the data bridge lines, an edge of the circuit layer, and an edge of the sealing layer.

* * * * *